(12) United States Patent
Zwijze et al.

(10) Patent No.: US 12,066,316 B2
(45) Date of Patent: Aug. 20, 2024

(54) METHOD FOR MONITORING A LOAD CARRIER VEHICLE, MONITORING DEVICE FOR A LOAD CARRIER VEHICLE, LOAD CARRIER VEHICLE, LOAD CARRIER VEHICLE SYSTEM AND SWAP BODY

(71) Applicant: Sensata Technologies, Inc., Attleboro, MA (US)

(72) Inventors: Robert Zwijze, Vriezenveen (NL); Frank Sienkiewicz, Bristol, RI (US); Jonas Bautista, Norfolk, MA (US); Sietse Hendriks, Enschede (NL); Dennis Kamphuis, Attleboro, MA (US); Andrew Forti, Attleboro, MA (US); John Greer, Northern Ireland (GB); Matthew Via, Attleboro, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 492 days.

(21) Appl. No.: 17/416,643

(22) PCT Filed: Dec. 21, 2018

(86) PCT No.: PCT/US2018/067130
§ 371 (c)(1),
(2) Date: Jun. 21, 2021

(87) PCT Pub. No.: WO2020/131102
PCT Pub. Date: Jun. 25, 2020

(65) Prior Publication Data
US 2022/0074785 A1 Mar. 10, 2022

(51) Int. Cl.
G01G 19/12 (2006.01)
B60G 17/019 (2006.01)
(Continued)

(52) U.S. Cl.
CPC ........... *G01G 19/12* (2013.01); *B60G 17/019* (2013.01); *B60P 1/6409* (2013.01); *G01M 1/122* (2013.01);
(Continued)

(58) Field of Classification Search
CPC .. G01G 19/12; B60G 17/019; B60G 2400/60; B60G 2204/111; B60P 1/6409
(Continued)

(56) References Cited

U.S. PATENT DOCUMENTS 5,929,388 A * 7/1999 Uehara ................. G01G 19/08
177/136
7,497,137 B2 * 3/2009 Tellenbach ......... G01G 23/3728
177/1
(Continued)

FOREIGN PATENT DOCUMENTS

CN 103068656 A 4/2013
DE 4425910 A1 3/1995
(Continued)

OTHER PUBLICATIONS

International Search Report and Written Opinion issued in PCT/US2018/067130 dated Sep. 12, 2019.
(Continued)

*Primary Examiner* — Jacques M Saint Surin
(74) *Attorney, Agent, or Firm* — Mark H. Whittenberger; Holland & Knight LLP

(57) ABSTRACT

The technology provides a method for monitoring a load carrier vehicle (10: 12: 22: 154), comprising measuring at least one sensor value indicating a force and determining a mass based on the at least one sensor value. Furthermore, monitoring devices (156) used in the method and load carrier vehicles (10: 12: 22: 154) are described.

21 Claims, 26 Drawing Sheets

(51) Int. Cl.
*B60P 1/64* (2006.01)
*G01M 1/12* (2006.01)

(52) U.S. Cl.
CPC .... *B60G 2204/111* (2013.01); *B60G 2400/60* (2013.01)

(58) Field of Classification Search
USPC .......................................................... 177/136
See application file for complete search history.

(56) References Cited

U.S. PATENT DOCUMENTS

| | | | | |
|---|---|---|---|---|
| 10,234,368 | B2* | 3/2019 | Cherney | G01N 9/02 |
| 10,641,646 | B2* | 5/2020 | Holden | G01G 19/086 |
| 10,752,075 | B1* | 8/2020 | Shukla | B60G 11/27 |
| 2003/0058118 | A1* | 3/2003 | Wilson | B60C 23/0483 |
| | | | | 340/442 |
| 2007/0006652 | A1* | 1/2007 | Weldon | G01G 23/3728 |
| | | | | 73/579 |

FOREIGN PATENT DOCUMENTS

| | | | |
|---|---|---|---|
| DE | 19918679 A1 * | 10/2000 | ............ G01G 19/08 |
| EP | 0496166 A2 | 7/1992 | |
| GB | 2461273 A | 12/2009 | |
| JP | 2007-139511 A | 6/2007 | |
| JP | 2012-78320 A | 4/2012 | |
| WO | 2012059147 A1 | 5/2012 | |

OTHER PUBLICATIONS

Chinese First Office Action issued in the related Application Serial No. 201880100719.9 on Nov. 29, 2023.
Chinese Second Office Action issued in related Application Serial No. 201880100719.9 on Jun. 15, 2024.

* cited by examiner

METHOD FOR MONITORING A LOAD CARRIER VEHICLE, MONITORING DEVICE FOR A LOAD CARRIER VEHICLE, LOAD CARRIER VEHICLE, LOAD CARRIER VEHICLE SYSTEM AND SWAP BODY

RELATED APPLICATIONS

The subject application is a U.S. National Stage application of International Application No. PCT/US2018/067130, filed on 21 Dec. 2018. The contents of which are herein incorporated by reference in their entirety.

TECHNICAL FIELD

The present technology relates to a method for monitoring a load carrier vehicle, a monitoring device for a load carrier vehicle, and a load carrier vehicle comprising at least one such monitoring device.

BACKGROUND ART

Load carrier vehicles such as trucks or trailers are used to convey goods via the road network. To ensure manoeuvrability and road safety as well as to prevent excessive road damage, certain maximum weights and axle loads must not be exceeded when transporting goods in this way.

It is known to measure the weight of a load carrier vehicle by means of a scale arranged, e.g., on the premises of the freight company operating the load carrier vehicle. However, such a measurement is time consuming because the load carrier vehicle needs to get to the scale in order to perform the measurement.

In addition, measuring the weight of the load carrier vehicle does not provide any more detailed information with respect to the load of the load carrier vehicle, especially during operation of the load carrier vehicle. However, more detailed information with respect to the load of the load carrier vehicle could be used to improve the stability and thus safety of the load carrier vehicle.

Several ways of conducting weight measurements during operation of the load carrier vehicle are known, for instance, based on the pressure inside air bellows in the suspension of load carrier vehicles. However, these methods are often not reliable and accurate enough.

Accordingly, there is a need for monitoring methods of load carrier vehicles providing improved manoeuvrability and road safety. Furthermore, there is a need for load carrier vehicles and load carrier vehicle systems providing improved manoeuvrability and road safety.

In addition, there is a need for simple and/or accurate monitoring devices, preferably adapted for easy mounting and maintenance, which can be used in load carrier vehicles in order to increase their safety.

SUMMARY

According to a first aspect, a method is provided for monitoring a load carrier vehicle, comprising measuring at least one sensor value indicating a force and determining a mass based on the at least one sensor value. By determining a mass based on the at least one sensor value, changes in the overall mass of the (loaded) vehicle can be accurately measured during operation of the load carrier vehicle compared to determining an initial mass of the vehicle and a load mass according to a waybill.

The load carrier vehicle can be a commercial vehicle, a truck, a towing vehicle, a semitrailer, a trailer. The load carrier vehicle can be a swap body for a commercial vehicle.

The method preferably further comprises the step of determining n partial weights based on the at least one sensor value indicating a force, wherein the load carrier vehicle has n weight transfer portions each weight transfer portion having an effective weight transfer position, wherein each partial weight is associated with a respective one of the n weight transfer portions, and wherein a weight of the load of the load carrier vehicle is transferred by means of the weight transfer portions to a surface bearing the load carrier vehicle. By determining the n partial weights, information related to a load distribution of the load of the load carrier vehicle can be obtained increasing safety of operation of the load carrier vehicle.

It is possible to determine a weight of the load of the load carrier vehicle based on the n partial weights allowing to compare the weight of the load of the load carrier vehicle with a maximum allowable load/payload of the load carrier vehicle in order to avoid an excess load on the load carrier vehicle.

In a preferred embodiment, determining the mass using the at least one sensor value comprises determining the mass based on the sum of the weight of the load of the load carrier vehicle and a weight of the load carrier vehicle, wherein each of the summands can be determined easily. The determination of the weight of the load carrier vehicle is particularly simple, if it is determined based on parameters of the load carrier vehicle.

The method can further comprise determining n partial torques, each resulting from a respective partial weight acting on an associated effective weight transfer position and determining a centre of gravity using the n partial torques. This determination of a centre of gravity can be performed at low computational cost by solving a low dimensional linear equation either analytically or approximately. The centre of gravity can be a centre of gravity of the load of the load carrier vehicle or a centre of gravity of the load carrier vehicle including the load of the load carrier vehicle.

It is preferred that each of the n partial weights represents a part of the weight of the load of the load carrier vehicle and each partial weight is transferred through an associated weight transfer portion. This allows to calculate spatially-dependent quantities influenced by the load of the load carrier vehicle, like an axle load and the like.

At least one of the weight transfer portions is preferably spaced from the surface bearing the load carrier vehicle allowing a measurement to be taken in such a weight transfer portion without a direct influence of the surface bearing the load carrier vehicle, in particular while the load carrier vehicle is moving. In a preferred embodiment, all the weight transfer portions are spaced from the surface without contacting the same.

In a preferred embodiment, the method further comprises determining, with respect to one of the weight transfer portions, a first force direction corresponding to a main weight transfer direction as well as determining, with respect to said weight transfer portion, a second force direction transverse to the first force direction. In this preferred embodiment, the method may further comprise the steps of providing said weight transfer portion with a sensor having a first sensing direction and a second sensing direction as well as arranging the sensor on the load carrier vehicle with the first sensing direction essentially oriented along the first force direction and with the second sensing direction essentially oriented along the second force direction. This leads to a reduction of measurement errors due to unwanted effects like a side load or a parasitic moment acting on the sensor.

Preferably, providing said weight transfer portion with a sensor comprises providing said weight transfer portion with a sensor having a sensitivity along the first sensing direction and a sensitivity along the second sensing direction, wherein the sensitivity along the first sensing direction is higher than the sensitivity along the second sensing direction. This further increases the reduction of measurement errors due to unwanted effects like a side load or a parasitic moment acting on the sensor. In a particularly preferred embodiment, the first sensing direction corresponds to a sensing direction of the sensor having a maximum sensitivity and the second sensing direction corresponds to a sensing direction of the sensor having a minimum sensitivity.

The sensor can have a signal neutral bending surface oriented essentially perpendicularly to the second force direction. The signal neutral bending surface can be essentially aligned with a neutral bending surface of the sensor resulting from an action of a force in the second force direction. The different signs of stress on the different sides of the neutral bending surface can be used in a measurement to cancel the effects of a force in the second force direction like a parasitic moment or a side load. Each of the signal neutral bending surface and the neutral bending surface can be a respective plane.

Determining the first force direction and/or determining the second force direction can comprise determining forces acting on said weight transfer portion. The determination of forces acting on said weight transfer portion provides data for accurate determination of the first and/or second force direction further allowing to reduce measurement errors due to unwanted effects like a side load or a parasitic moment acting on the sensor.

In a preferred embodiment, the method further comprises transmitting data representative of the at least one sensor value wirelessly, preferably to a load carrier vehicle hub configured to receive the transmitted data. This avoids the need for providing data connection lines/cables for the monitoring device simplifying sensor mounting and sensor maintenance. In a particularly preferred embodiment, the method further comprises receiving data from the load carrier vehicle hub.

Preferably, the method further comprises at least one of the following steps to be performed by the load carrier vehicle hub using the transmitted data representative of the at least one sensor value: determining a mass based on the at least one sensor value; determining a weight of the load of the vehicle; determining a weight of the load carrier vehicle; determining at least one of the n partial torques, and determining a centre of gravity. The load carrier vehicle hub combines information from multiple monitoring devices allowing to deduct characteristics, for which information from multiple monitoring devices is needed.

The sensor value may indicate a mass or a weight acting on the load carrier vehicle; and/or the at least one sensor value may be measured by multiple weight sensor devices; and/or the method may further comprise a step of transmitting the sensor values to an evaluation unit; and/or the total mass may form part of an output data; and/or determining the total mass using the at least one sensor value may comprise determining the overall mass using the sensor values, and/or the method may further comprise a step of sending the output data, preferably by the evaluation unit, in particular wirelessly, and/or the method may further comprise a step of saving the output data locally. The evaluation unit can be a load carrier vehicle hub.

According to a second aspect, a monitoring device for a load carrier vehicle is provided, comprising at least one sensor device with at least one sensor, wherein the monitoring device is adapted to at least participate in carrying out or adapted to carry out a method according to any of the above described embodiments of the method according to the first aspect. Such a monitoring device allows to measure quantities for monitoring a load carrier vehicle.

The load carrier vehicle is preferably a commercial vehicle, a truck, a towing vehicle, a semitrailer, a trailer, or a swap body for a commercial vehicle.

The sensor can comprise a force sensing plate comprising at least one strain gauge. This sensor design can be used to accurately and reliably determine the sensor value indicating a force.

Preferably, the sensor further comprises a counter acting plate connected to the force sensing plate increasing the rigidity of the sensor and thus reducing potential influences of unwanted forces or momenta on a measurement result of the sensor.

The counter acting plate can be connected, preferably directly, to the force sensing plate reducing the complexity of the sensor and thus its size. Furthermore, the material for each of the counter acting plate and the force sensing plate can be different and chosen according to the mechanical needs.

In a preferred embodiment the counter acting plate is connected to the force sensing plate in a circumferential region of the force sensing plate, preferably at the circumference of the force sensing plate. Such an arrangement can be easily and cost effectively produced e.g. by a weld at a common circumference of the force sensing plate and the counter acting plate.

Preferably at least one of the force sensing plate and the counter acting plate comprises a connection port within the thickness of the respective one of the force sensing plate and the counter acting plate; wherein the connection port is adapted to receive a connection device. Such an arrangement allows the sensor being assembled using simple parts which can be produced cost effectively.

The connection device can be an intermediate element extending beyond the thickness of the respective one of the force sensing plate and the counter acting plate, wherein the intermediate element is adapted to receive a connection element. The extension of the intermediate element beyond the thickness of the respective one of the force sensing plate and the counter acting plate allows to receive big connection elements without the need to accommodate such connection elements within the respective one of the force sensing plate and the counter acting plate resulting in a compact sensor.

Optionally, the connection element received in the intermediate element is essentially not extending on one side of the respective one of the force sensing plate and the counter acting plate allowing to keep the distance between the force sensing plate and the counter acting plate small, and thus the sensor compact, while large connection elements can be used with such a sensor.

The sensor can further comprise a direction sensitive strain gauge or the strain gauge can be a direction sensitive strain gauge. The use of a direction sensitive strain gauge makes it possible to measure the influence of forces acting in a wanted and/or unwanted direction.

Preferably, the direction sensitive strain gauge comprises a first strain gauge element, and/or the direction sensitive strain gauge comprises a second strain gauge element. The use of a first and/or second strain gauge element provides a simple arrangement adapted to specific forces.

In particular, the first strain gauge element can be sensitive to strain in a direction defined by a first line segment, and is preferably oriented along the first line segment; and/or the second strain gauge element can be sensitive to strain in a direction defined by a second line segment and is preferably oriented along the second line segment. Using this arrangement, it is possible to measure forces in multiple directions.

In a preferred embodiment, a projection of the first line segment on a plane and a projection of the second line segment on the plane are oriented relative to each other at an angle different from 0 and 180 degrees, wherein the plane is preferably defined by a force sensing plate of the monitoring device; wherein the angle is preferably 90 degrees. In this arrangement, forces can be measured in linearly independent multiple directions.

The direction sensitive strain gauge can comprise a piezo resistive material and/or piezo electric material and/or a metal foil. The use of these materials allows a production of strain gauges with well-defined properties, e.g. due to use of high quality semiconductor based materials. The at least one strain gauge can be provided at one side of the force sensing plate. Preferably, the at least one strain gauge is provided at the side facing away from the counter acting plate allowing easy assembly of the senor. The at least one strain gauge can be provided at the side facing the counter acting plate thereby being protected from e.g. mechanical damage by the counter acting plate.

In a preferred embodiment the sensor comprises two direction sensitive strain gauges, each comprising a first strain gauge element, wherein the two direction sensitive strain gauges are provided such that the first strain gauge element of a first one of the two direction sensitive strain gauges is essentially aligned with the first strain gauge element of a second one of the two direction sensitive strain gauges along a strain gauge alignment line. Such an arrangement of the first strain gauge elements allows to provide signals from each of the two direction sensitive strain gauges adapted to increase a sensitivity of the sensor in a direction.

In a preferred embodiment, the sensor has a signal neutral bending surface or plane. A signal neutral bending surface or plane is a surface or plane such that a force perpendicularly acting on a sensing structure of the sensor to the signal neutral bending surface or plane has no or essentially no effect on an output value of the sensor.

Preferably, the sensor is adapted to measure a force in a first sensing direction perpendicular to the force sensing plate. Preferably, the sensor has a first sensitivity along the first sensing direction and a sensitivity along a second sensing direction, the second sensing direction being perpendicular to the signal neutral bending surface or plane. In a preferred embodiment the sensitivity along the first sensing direction is higher than the sensitivity along the second sensing direction. In a particularly preferred embodiment, the first sensing direction corresponds to a sensing direction of the sensor having a maximum sensitivity and the second sensing direction corresponds to a sensing direction of the sensor having a minimum sensitivity.

The strain gauge alignment line can pass a region of a connection port of the force sensing plate. Preferably, it can pass essentially through a centre of the connection port of the force sensing plate. This allows a rotation of the strain gauge alignment line about essentially the connection port while the sensor is being mounted to reduce parasitic influence of forces on measuring a sensor value.

The second line segment of the first one of the two direction sensitive strain gauges can be oriented essentially parallel to the second line segment of the second one of the two direction sensitive strain gauges. Such an arrangement of the second line segments makes it possible to provide signals from each of the two direction sensitive strain gauges adapted to reduce a sensitivity of the sensor in a different direction.

In a preferred embodiment, at least one of the direction sensitive strain gauges is placed between at least two respective groove sections formed in the force sensing plate. The at least two groove sections can reduce a change of properties of the at least one of the direction sensitive strain gauges caused by a strain in the force sensing plate essentially acting perpendicularly to the at least one of the two groove sections.

In a particularly preferred embodiment, each of the sections of the at least two respective groove sections is essentially parallel to the strain gauge alignment line; and preferably the groove sections of the respective at least two groove sections are essentially parallel to each other. Such an arrangement can reduce a change of properties of the at least one of the direction sensitive strain gauges caused by a strain in the force sensing plate essentially acting perpendicularly to the strain gauge alignment line.

A length of at least one of the at least two groove sections can be bigger than the extension of the at least one of the direction sensitive strain gauges. This allows for a significant reduction of a change of properties of the at least one of the direction sensitive strain gauges caused by a strain in the force sensing plate essentially acting perpendicular to the at least one of the at least two grooves.

Furthermore, the at least one strain gauge or at least one direction sensitive strain gauge can be placed within a region essentially surrounded by a circumferential groove formed in the force sensing plate, which can be crossed by groove sections formed in the force sensing plate. It was found that a provision of the circumferential groove around the at least one strain gauge or at least one direction sensitive strain gauge allows to reduce a negative influence of a side load and a parasitic moment on the measurement of the sensor. Furthermore, such an arrangement of the circumferential groove can also be used to increase a signal amplitude from the sensor and to improve non-linearity of the signal.

In a preferred embodiment, the monitoring device further comprises a wireless communication unit adapted to transmit data representative of a sensor value measured by the sensor. This avoids the need for providing data connection lines/cables for the monitoring device thereby simplifying mounting and maintenance of the monitoring device. In a particularly preferred embodiment, the wireless communication unit is further adapted to receive data (e.g., from a load carrier vehicle hub).

Furthermore, the monitoring device can comprise an internal power supply unit, e.g., a battery. This avoids the need for providing power connection cables thereby further simplifying mounting and maintenance of the monitoring device.

In the monitoring device, the at least one sensor device can be a weight sensor device; and/or the monitoring device can comprise further multiple weight sensor devices, each can be provided with at least one force sensor; and/or the monitoring device can comprise further an evaluation unit preferably comprising a computing unit; and/or the evaluation unit can be connected with the at least one, preferably all, weight sensor devices.

According to a third aspect a use of a monitoring device according to any of the above described embodiments of the monitoring device according to the second aspect in a vehicle is envisioned, preferably in a method of determining a mass.

Preferably, the method of determining a mass is a method according to any of the above described embodiments of the method according to the first aspect.

According to a fourth aspect, there is provided a load carrier vehicle comprising at least one monitoring device, preferably at least one monitoring device according to any of the above described embodiments of the monitoring device according to the second aspect, wherein the monitoring device comprises a sensor; and wherein the monitoring device is adapted to transmit data representative of a sensor value measured by the sensor. If at least one monitoring device according to any of the above described embodiments of the monitoring device according to the second aspect is used in the load carrier vehicle, advantages of the second aspect are also present in the fourth aspect.

The load carrier vehicle can be e.g. a commercial vehicle, a truck, a towing vehicle, a semitrailer, a trailer, or a swap body for a commercial vehicle.

In a preferred embodiment, the load carrier vehicle further comprises a load carrier vehicle chassis; a load carrier vehicle suspension unit fixed with respect to the load carrier vehicle chassis, the load carrier vehicle suspension unit comprising an axle support element mounted movably with respect to the load carrier vehicle chassis, and a flexible bellow structure with a flexible bellow, wherein the flexible bellow is fillable with a compressible fluid, the flexible bellow structure being mounted between the axle support element and the load carrier vehicle chassis, wherein the monitoring device is positioned in a force transmission path between one end of the flexible bellow and the load carrier vehicle chassis or the load carrier vehicle suspension unit. This arrangement of the monitoring device requires surprisingly few modifications of the load carrier vehicle suspension unit, e.g., of the flexible bellow structure, and provides for simple mounting and servicing of the monitoring device since the flexible bellow structure can be easily removed once the flexible bellow has been emptied.

In particular, the axle support element can be an axle support arm mounted rotatably with respect to the load carrier vehicle chassis. The main contribution of forces acting on the monitoring device can be determined based essentially on the geometry of the load carrier vehicle suspension unit alone, allowing an arrangement of the monitoring device reducing influence of a side load or a parasitic moment without extensive additional measurements.

In a preferred embodiment, a signal neutral bending surface or plane of the monitoring device is oriented with respect to a section of the flexible bellow structure or with respect to a section of the axle support element or with respect to a section of the load carrier vehicle chassis to minimize a monitoring device error due to a side load and/or a parasitic moment, wherein preferably a strain gauge alignment line of the monitoring device is aligned with the signal neutral bending surface or plane. In such an arrangement, measurement errors of the monitoring device are reduced.

In a further preferred embodiment, the load carrier vehicle is adapted to be coupled with a further load carrier vehicle, the load carrier vehicle further comprising a load carrier vehicle support element adapted to transfer at least a part of a weight of the load carrier vehicle to a surface bearing the load carrier vehicle, wherein a contact portion of the load carrier vehicle support element is adapted to be lifted from the surface bearing the load carrier vehicle; a monitoring device, preferably a monitoring device according to any of the above described embodiments of the monitoring device according to the second aspect, associated with the load carrier vehicle support element and adapted to measure weight transferred through the load carrier vehicle support element. In such a load carrier vehicle, it is possible to calculate properties of a load of the load carrier vehicle, e.g. a mass or a centre of gravity, even if the load carrier vehicle is not ready for transport, e.g. the load carrier vehicle can be a semi-trailer supported by a landing gear as a load carrier vehicle support element.

The load carrier vehicle support element can be a semi-trailer landing gear support strut/feet or a swap body support strut/feet. Furthermore, the contact portion of the load carrier vehicle support element can be different from a wheel or roller.

The monitoring device is preferably adapted to transmit data representative of the sensor value measured by the sensor wirelessly, thereby avoiding the need for providing data connection lines/cables for the monitoring device in the load carrier vehicle and simplifying mounting and maintenance of the monitoring device in the load carrier vehicle as well as reducing the need for expensive cabling.

The load carrier vehicle can further comprise a load carrier vehicle hub adapted to receive the data from at least one, preferably multiple, monitoring devices wirelessly. The load carrier vehicle hub simplifies data collection from monitoring devices and avoids the installation of data transfer lines/cables between the monitoring devices and the load carrier vehicle hub. In addition, the load carrier vehicle hub may also be adapted to transmit data to at least one, preferably multiple, monitoring devices wirelessly.

The load carrier vehicle hub can be adapted to determine a first quantity based on the data from at least one, preferably multiple, monitoring devices reducing the power consumption in the at least one monitoring device by reducing a need for computational power in the at least one monitoring device.

Preferably, the load carrier vehicle hub is adapted to transmit the first quantity wirelessly allowing further processing of the first quantity without any hard wired data transfer between the monitoring devices and the load carrier vehicle hub.

Furthermore, the monitoring device can be adapted to transmit the data representative of the sensor value measured by the sensor continuously, periodically or on demand, allowing an adaption of wireless data transmission to the power source available to the monitoring device.

The monitoring device is preferably provided with an internal power supply unit, in particular a battery, in order to avoid the provision of power lines/cables connected to the monitoring device, which in turn simplifies mounting and maintenance of the monitoring device.

The load carrier vehicle can comprise a loading space which can be restricted by a loading surface. Furthermore, the load carrier vehicle can be a semitrailer or trailer to be coupled with a towing vehicle.

According to a fifth aspect, there is provided a load carrier vehicle system comprising a first load carrier vehicle according to any of the above described embodiments of the load carrier vehicle according to the fourth aspect, a second load carrier vehicle, wherein the first load carrier vehicle can be coupled mechanically to the second load carrier vehicle to transmit an acceleration and/or deceleration force between the first load carrier vehicle and the second load carrier vehicle. The advantages of the fourth aspect are also present in such a load carrier vehicle system.

Preferably, the second load carrier vehicle comprises a second load carrier vehicle hub adapted to send and receive data from the first load carrier vehicle hub wirelessly allowing a data transfer between the first and second load carrier vehicle without additional dedicated signal lines and thus reducing the complexity of the load carrier vehicle system.

The second load carrier vehicle can comprise a monitoring device according to any of the above described embodiments of the monitoring device according to the second aspect allowing to measure weight, e.g. weight transferred from one of the first and second load carrier vehicle to the other one of the first and second load carrier vehicle.

In a preferred embodiment, the load carrier vehicle system further comprises an actuator adapted to act between the first and the second load carrier vehicle to transfer weight from one of the first and second load carrier vehicle to the other one of the first and second load carrier through the actuator in a first state of the actuator, and adapted not to transfer weight from one of the first and second load carrier vehicle to the other one of the first and second load carrier vehicle through the actuator in a second state of the actuator, wherein the weight transferred through the actuator is measured by a monitoring device, preferably by a monitoring device according to any of the above described embodiments of the monitoring device according to the second aspect. Such an arrangement allows to choose a force transmission path to allow an accurate weight measurement.

The load carrier vehicle system can further comprise a weight transfer arrangement between the first and second load carrier vehicle adapted to transfer a weight from one of the first and second load carrier vehicle to the other one of the first and second load carrier vehicle, wherein in the first state of the actuator no weight from the one of the first and second load carrier vehicle to the other one of the first and second load carrier vehicle is transferred through the weight transfer arrangement and wherein in the second state of the actuator weight from the one of the first and second load carrier vehicle to the other one of the first and second load carrier vehicle is transferred through the weight transfer arrangement. Since such weight transfer arrangements between the first and second load carrier vehicle are susceptible to side loads introducing errors in weight measurements, the above described arrangement allows to avoid a weight transmission through such a weight transfer arrangement increasing accuracy of a weight measurement.

In order to provide interchangeability of first and second load carrier vehicles, the weight transfer arrangement comprises a fifth wheel on one of the first and the second load carrier vehicle and a load transferring surface, preferably supporting a kingpin, on the other one of the first and the second load carrier vehicle.

According to a sixth aspect, there is provided a swap body for a commercial vehicle having at least one preferably non-rotatable support device having at least one support element extending vertically in a support position, wherein each support element has a standing surface, wherein each support element is associated with a weight sensor device, and wherein the swap body has a monitoring device according to any of the above described embodiments of the monitoring device according to the second aspect.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION

The advantages, and other features of the technology disclosed herein, will become more readily apparent to those having ordinary skill in the art from the following detailed description of certain preferred embodiments taken in conjunction with the drawings which set forth representative embodiments of the present technology. Also, the following detailed description does not limit the technology.

Figure 1:
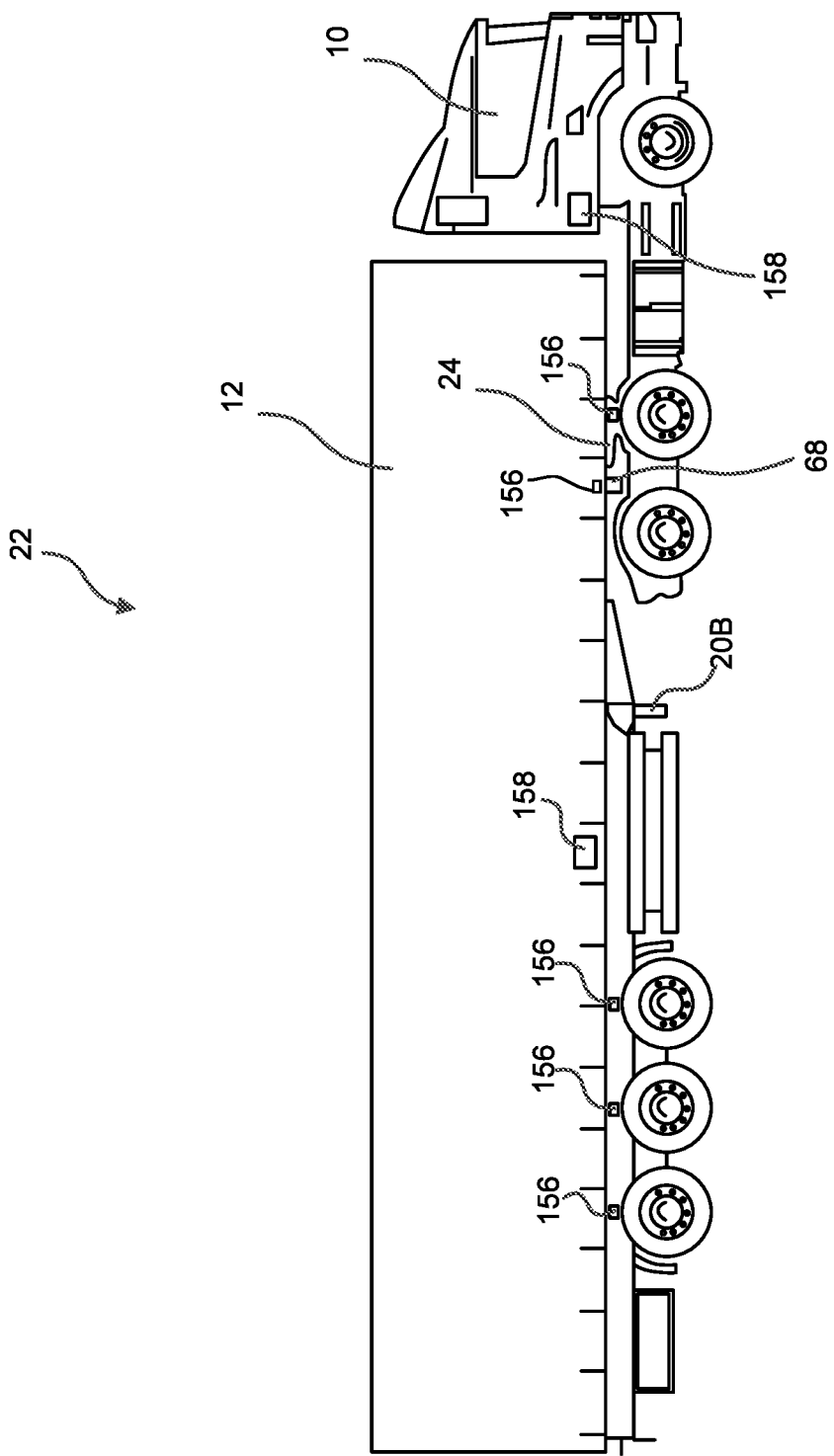
FIG. 1 shows a load carrier vehicle system comprising a truck and a semitrailer.

FIG. 1 shows an exemplary load carrier vehicle system comprising a combination 22 of two load carrier vehicles, a truck 10 and a semitrailer 12. Alternatively, the entire combination 22 can be regarded as constituting a load carrier vehicle. Each load carrier vehicle may comprise multiple monitoring devices 156 and at least one load carrier vehicle hub 158 to be described in further detail below. The semitrailer 12 is shown in FIG. 1 as having three axles. However, the number of axles of the semitrailer 12 is not limited to three in this disclosure and FIG. 1 shows only an illustrative configuration. The number of axles of the semitrailer can, for instance, be one or two or any other appropriate number of axles in the context of the present disclosure.

In the present disclosure, different aspects are described contributing to enablement of a method for determining a mass e.g. of a load of the semitrailer 12 or determining a centre of gravity of the load of the semitrailer 12.

Figure 2:
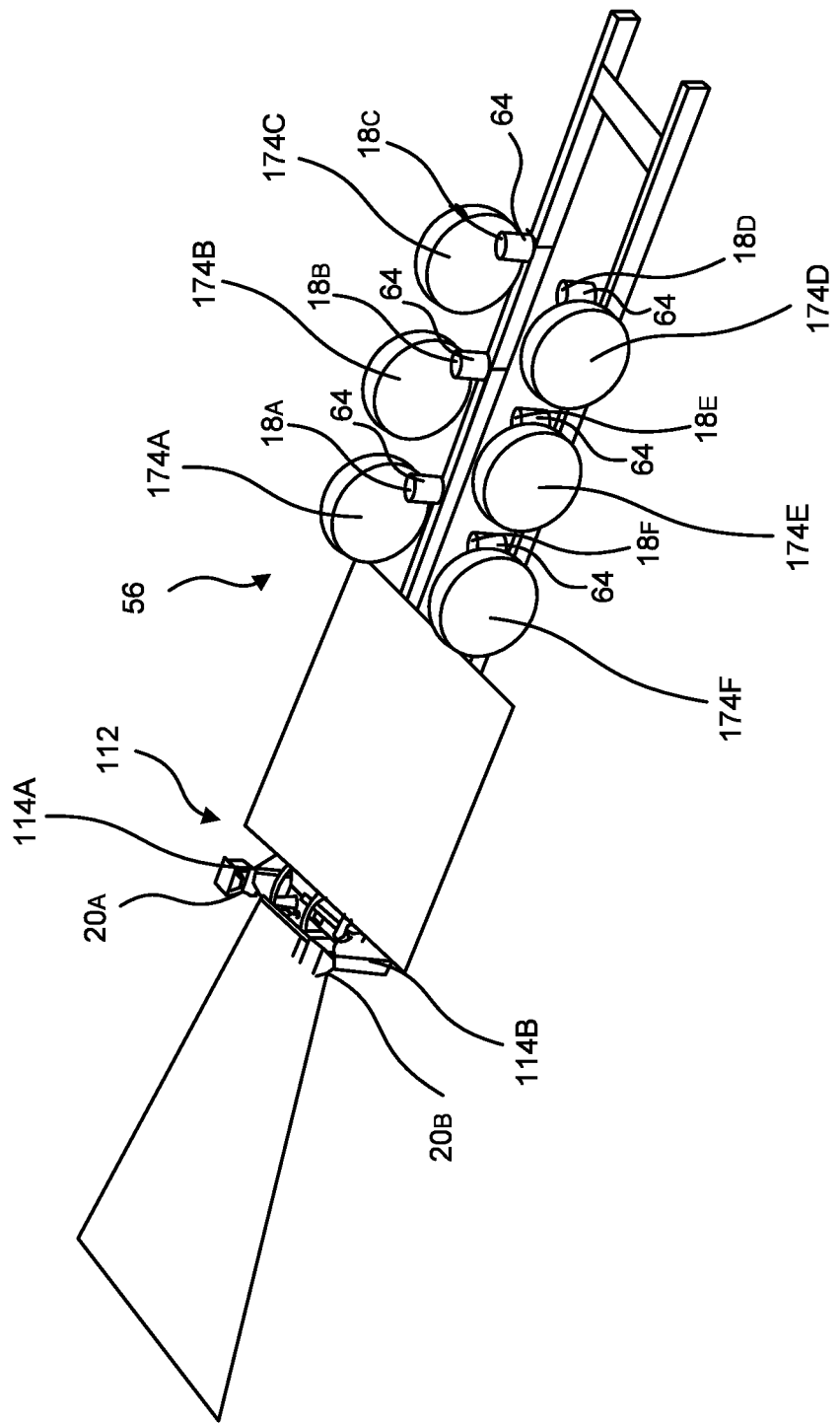
FIG. 2 shows schematically an underside of semitrailer.

FIG. 2 shows schematically an underside of the semitrailer 12 shown in FIG. 1 with a load carrier vehicle chassis 56, flexible bellow structures 64, wheels 174A-174F, weight transfer portions 18A-18F as well as 20A, 20B, and a landing gear 112 with struts 114A, 114B.

Figure 3:
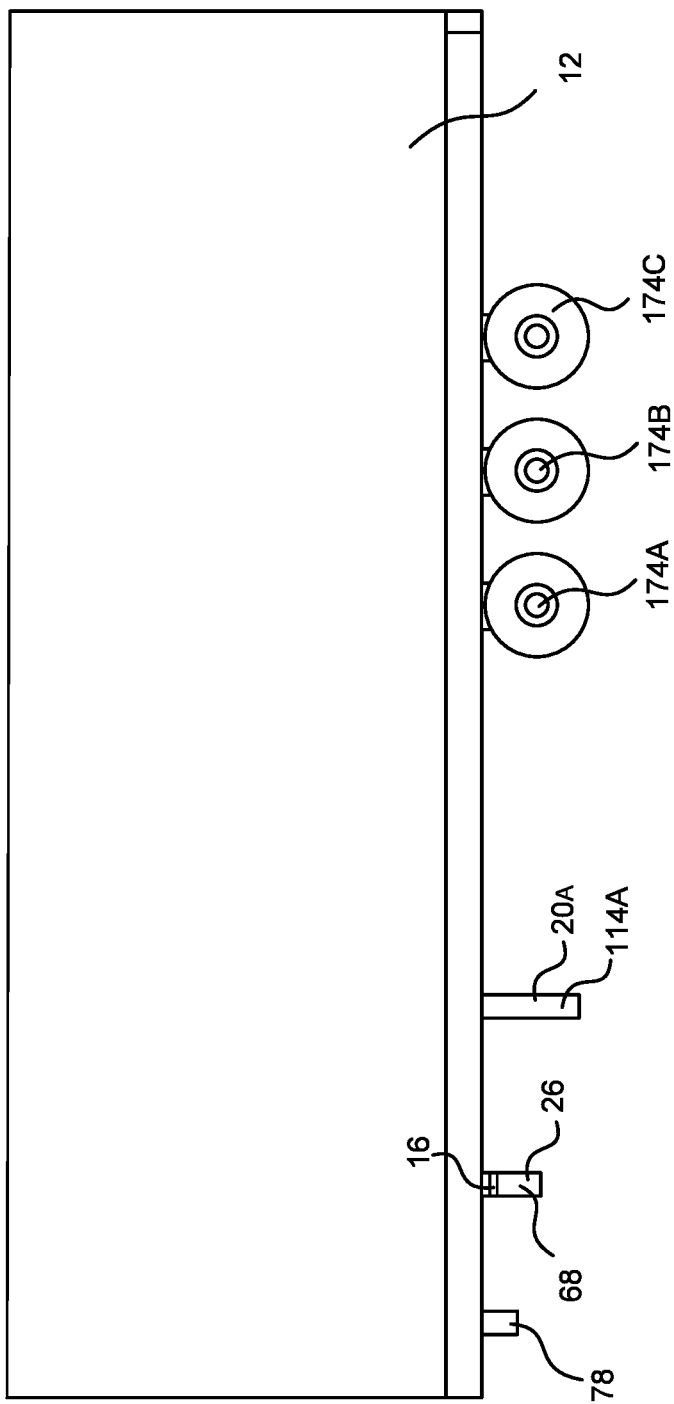
FIG. 3 shows schematically a side view of a semitrailer.

FIG. 3 shows schematically a side view of the semitrailer 12 shown in FIG. 1 comprising a kingpin 78 for coupling the semitrailer 12 with the truck 10. In addition, an actuator 68 with a sensor 16, representing a further weight transfer portion 26, and a strut 114A, representing the weight transfer portion 20A, are shown.

Figure 4:
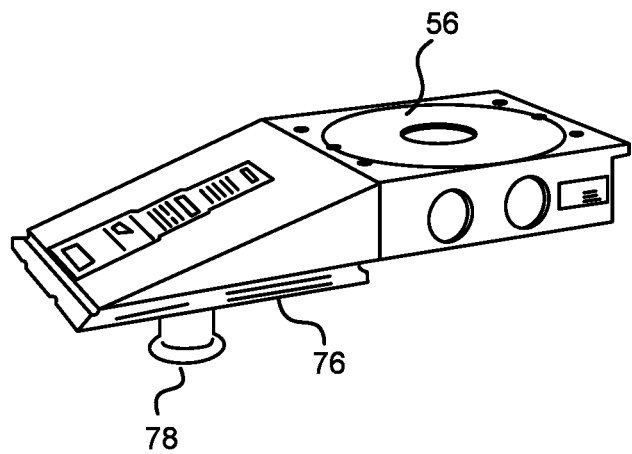
FIG. 4 shows a section of a load carrier vehicle.

As shown in FIG. 4, the kingpin 78 can be provided on a load transferring plate 76 connected to the load carrier vehicle chassis 56 of the semitrailer 12.

Figure 5:
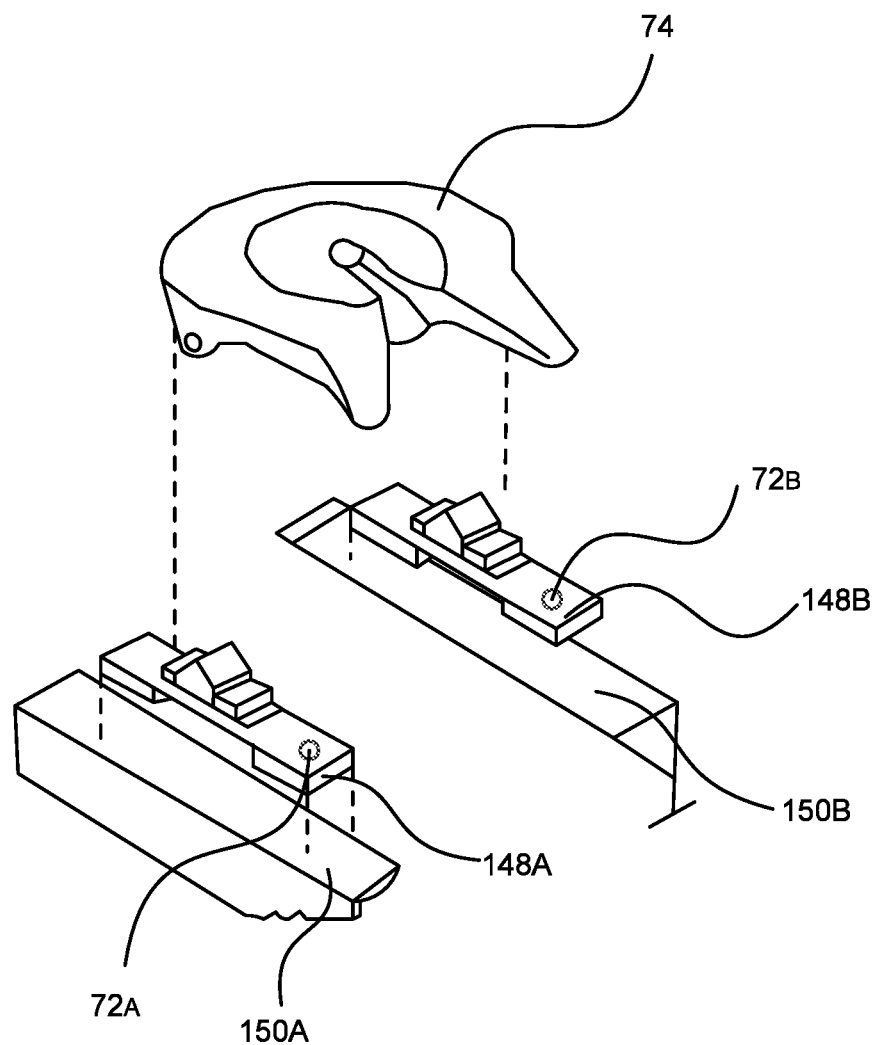
FIG. 5 shows a section of a fifth wheel arrangement.

FIG. 5 shows a fifth wheel 74 mounted by means of a holding structure 148A, 148B on a truck chassis 150A, 150B of the truck 10, wherein the kingpin 78 is adapted to transfer a pulling or pushing force to the fifth wheel 74. The actuator 68 can be adapted to separate a connection between the load transferring plate 76 and the fifth wheel 74.

In order to obtain a basis for the determination of a mass e.g. of a load of the semitrailer 12, or of a centre of gravity of the load of the semitrailer 12, at least one monitoring device 156 is provided in the load carrier vehicle system 22. The monitoring device 156 comprises at least one sensor device with at least one sensor 14 or 16 (to be described below). The sensor 14 can be e.g. a commercially available load cell. However, use of the sensor 16 described below is preferred. The sensor device can comprise readout electronics for the sensor. The monitoring device can further comprise communication means in order to transmit and optionally receive data representing at least one sensor value.

Figure 6:
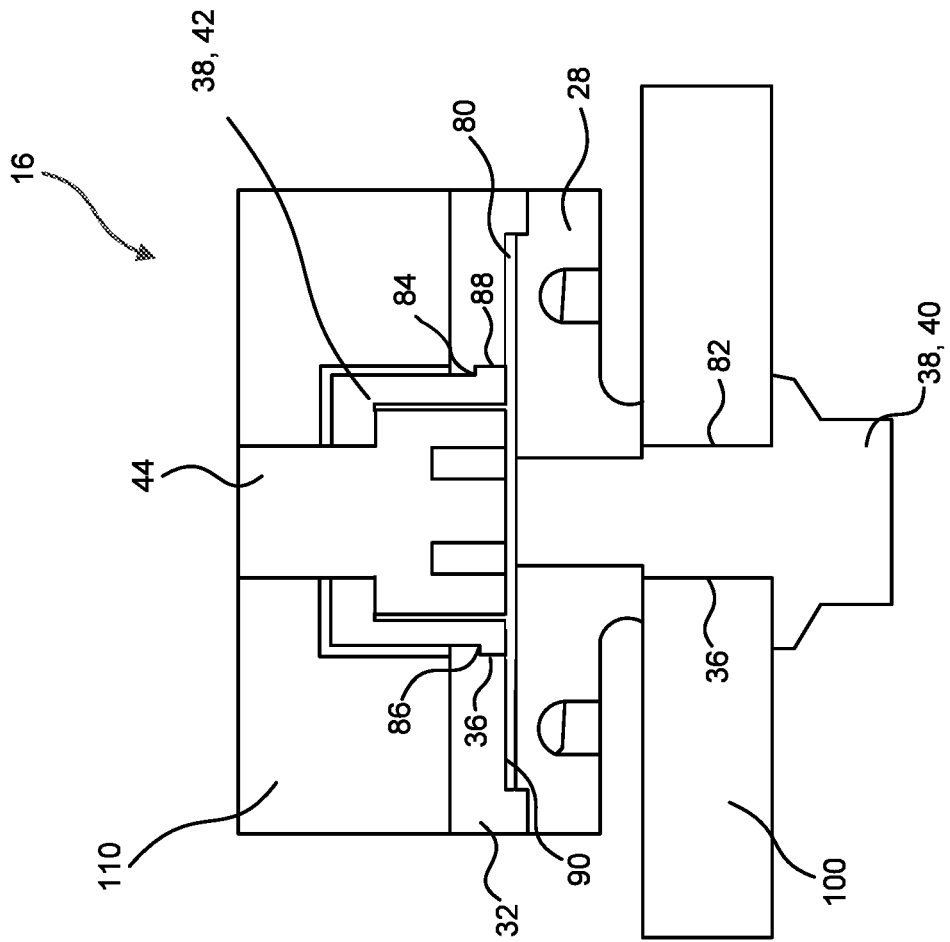
FIG. 6 shows schematically a cross-section of a sensor mounted in a load carrier vehicle suspension unit.
Figure 7:
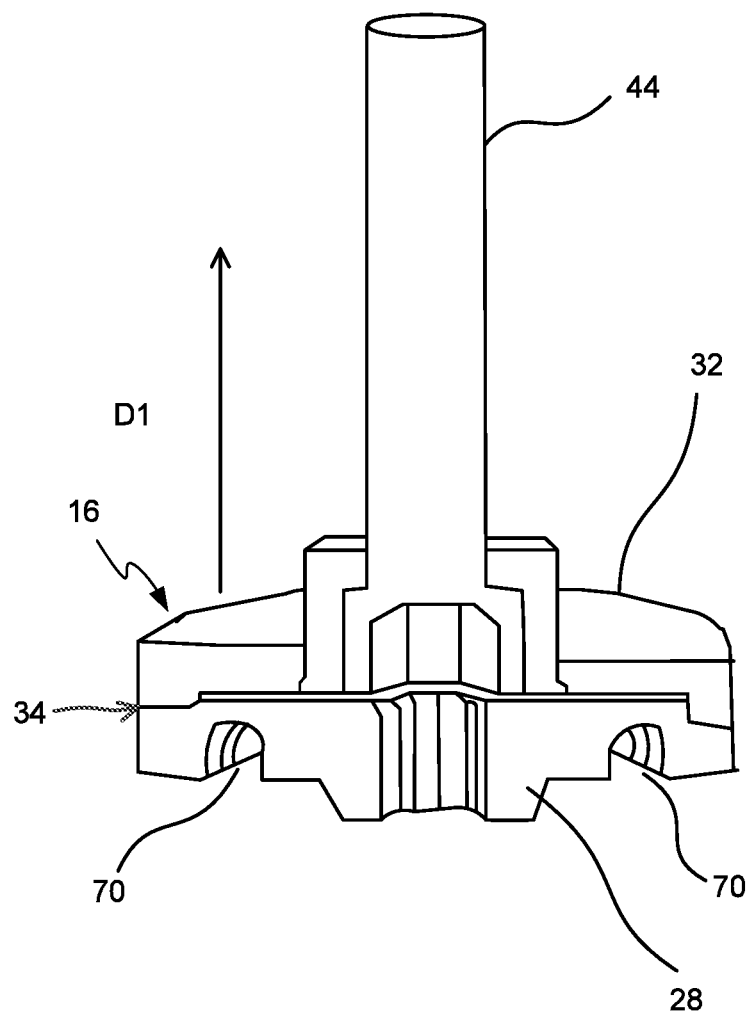
FIG. 7 shows schematically a cross-section of the sensor.

FIG. 6 shows schematically a cross-section of a sensor 16 mounted on a load carrier vehicle and FIG. 7 shows schematically a cross-section of the sensor 16. As shown in FIGS. 6 and 7, the sensor 16 comprises a force sensing plate 28 and a counter acting plate 32. The sensor 16 is connected, by means of screws 44 and 40, to an axle support element 100 and an adapter element 110 arranged between bellow 60 and the axle support element 100. The screws 44 and 40 are mounted on the sensor 16 using connection ports 36. The force sensing plate 28 can comprise at least one strain gauge 30, 46A, 46B (see below). Please note that for the sake of simplicity, no wiring of the strain gauge 30, 46A, 46B leading to the outside of the sensor is shown. The force sensing plate 28 is preferably made out of 17-4PH steel providing the desired flexibility. The force sensing plate 28 functions essentially as a membrane providing flexibility in a direction D1 and stiffness in a direction perpendicular to D1. In the prior art, the whole load cells used to be produced out of 17-4PH steel increasing the cost of the load cell significantly.

The sensor 16 further comprises the counter acting plate 32 connected to the force sensing plate 28. The counter acting plate 32 is preferably welded directly to the force sensing plate 28 in a circumferential region 34 of the force sensing plate, preferably at the circumference of the force sensing plate. However, gluing, riveting or screwing and the like can also be used to obtain this connection. In order to allow the force sensing plate 28 to flex both parallel and anti-parallel to the direction D1, there is a gap 80 provided between the force sensing plate 28 and the counter acting plate 32. In order to reduce the costs of the sensor 16, the material of the counter acting plate 32 can be made out of material other (and cheaper) than 17-4PH steel.

Both the force sensing plate 28 and the counter acting plate 32 can each comprise a connection port 36 within their respective thickness. Alternatively, only one of these two plates can comprise a connection port 36. The connection port 36 can comprise an opening 82 (shown in FIG. 6) provided with a thread in the force sensing plate 28. The connection port 36 is adapted to receive a connection device 38, in the case of the force sensing plate 28, a threaded portion of the screw 40.

Alternatively, as shown in an exemplary manner with respect to the counter acting plate 32, the connection port 36 can be an opening 84 provided with a step 86. The step 86 is adapted to retain a connection device 38 formed as an intermediate element 42 e.g. in the form of a cap, provided with a shoulder 88, the shoulder 88 essentially mating with the step 86. The intermediate element 42 is adapted to be positioned essentially flush with the surface 90 of the counter acting plate 32 facing the force sensing plate 28, and to extend beyond the thickness of the counter acting plate 32 in a direction facing away from the force sensing plate 28. The intermediate element 42 can be adapted to receive a connection element, e.g. a screw 44, and, in particular, the screw head of the screw 44. As a consequence, only a narrow gap 80 needs to be provided between the force sensing plate 28 and the counter acting plate 32 keeping the sensor 16 compact. Please note that the above described concepts of the connection ports 36 can be interchanged between the force sensing plate 28 and the counter acting plate 32.

Figure 8:
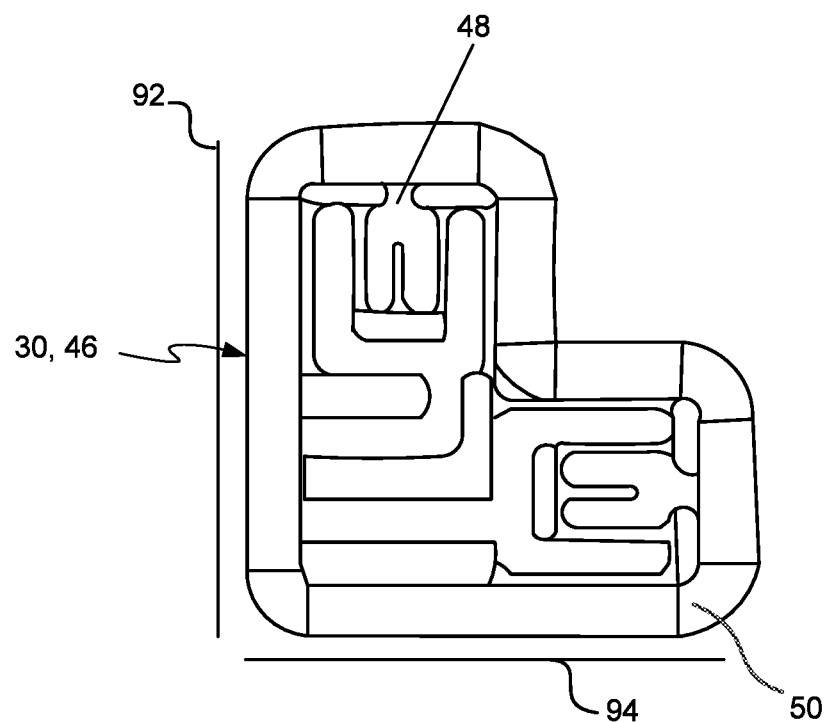
FIG. 8 shows a direction sensitive strain gauge.
Figure 9:
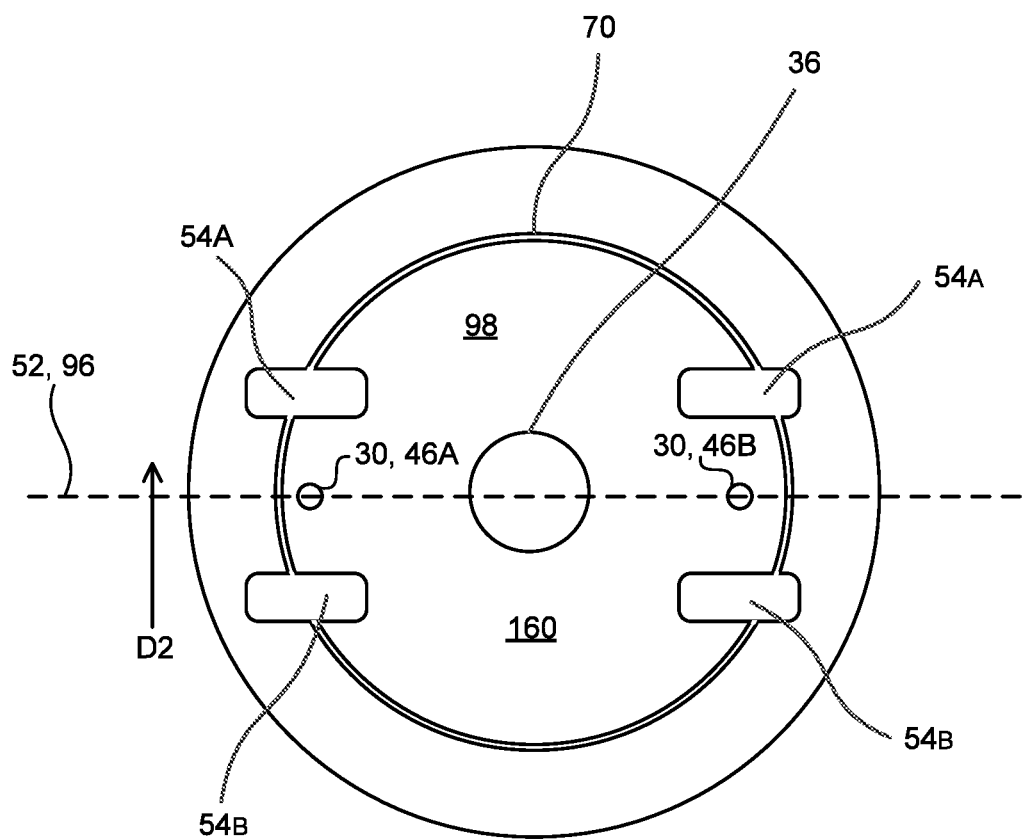
FIG. 9 shows schematically a force sensing plate.

FIG. 8 shows a direction sensitive strain gauge 30, 46 and FIG. 9 shows schematically a force sensing plate 28 with strain gauges 30, 46A, 46B, groove sections 54A, 54B and a circumferential groove 70. As shown in FIG. 8, each of the strain gauges 46A, 46B can be a direction sensitive strain gauge. The output of a direction sensitive strain gauge preferably does depend on the magnitude as well as the direction of the strain measured. Preferably, each of the direction sensitive strain gauges 46A, 46B comprises a first strain gauge element 48, and a second strain gauge element 50, each of which is preferably formed of piezo resistive material and/or piezo electric material and/or a metal foil. The arrangement of the piezo resistive material is preferably such that the first strain gauge element can be sensitive to strain in a direction defined by a first line segment 92, and is preferably oriented along the first line segment 92. Furthermore, the arrangement of the piezo resistive material is preferably such that the second strain gauge element 50 can be sensitive to strain in a direction defined by a second line segment 94 and is preferably oriented along the second line segment 94.

Preferably, the first strain gauge element 48 and the second strain gauge element 50 are arranged essentially in a common plane. Preferably the first 92 and second 94 line segment are oriented at an angle different from 0 and 180 degrees relative to each other. In case the first strain gauge element 48 and the second strain gauge element 50 are not arranged essentially in a common plane, it is preferred that a projection of the first line segment on a plane along a direction perpendicular to the plane, preferably a plane defined by a surface of the force sensing plate 28, and a projection of the second line segment on the plane along a direction perpendicular to the plane are oriented at an angle different from 0 and 180 degrees relative to each other. The angle is preferably 90 degrees.

The direction sensitive strain gauge 46A, 46B can comprise a piezo resistive material and/or piezo electric material and/or a metal foil.

The at least one, or each, strain gauge 46A, 46B can be provided at one side of the force sensing plate 28. The at least one strain gauge 46A, 46B can be provided at the side facing away from the counter acting plate 32 allowing easy assembly of the sensor 16. The at least one, or each, strain gauge 46A, 46B can be covered with a cap (not shown) in order to protect the at least one, or each, strain gauge 46A, 46B from the environment. Alternatively, the at least one, or each, strain gauge 46A, 46B can be provided at the side facing the counter acting plate. Such an arrangement protects each strain gauge 46A, 46B from the environment. Due to the electrical connections leading to the outside of the sensor 16 there is, however, a need for sealing the inside of the sensor 16.

In the embodiment shown in FIG. 9, the sensor 16 comprises two direction sensitive strain gauges 46A, 46B on the force sensing plate 28, each comprising a first strain gauge element 48, wherein the two direction sensitive strain gauges 46A, 46B are provided such that the first strain gauge element 48 of a first one 46A of the two direction sensitive strain gauges is essentially aligned with the first strain gauge element 48 of a second 46B one of the two direction sensitive strain gauges along a strain gauge alignment line 96. This is an embodiments allowing the sensor 16 to have a signal neutral bending surface or plane 52, as will be explained below.

Forces acting between the force sensing plate 28 and the counter acting plate 32 can be measured by sensor 16. However, in case a force acting parallel to each of the above mentioned plates is transferred via the connection port to the sensor 16, e.g. in a direction D2, stress with different signs is being generated in the force sensing plate 28 in the regions left 98 and right 160 of the strain gauge alignment line 96. The regions 98 and 160 are separated by a neutral bending surface or plane, preferably a neutral bending surface or plane going through the force sensing plate 28. The neutral bending surface is defined by the points where the strain in the force sensing plate 28 changes its sign.

The strain gauge alignment line 96 therefore preferably passes through a region of a connection port 36 of the force sensing plate 28, and, more preferably, essentially through a centre of the connection port 36 of the force sensing plate 28.

Figure 10:
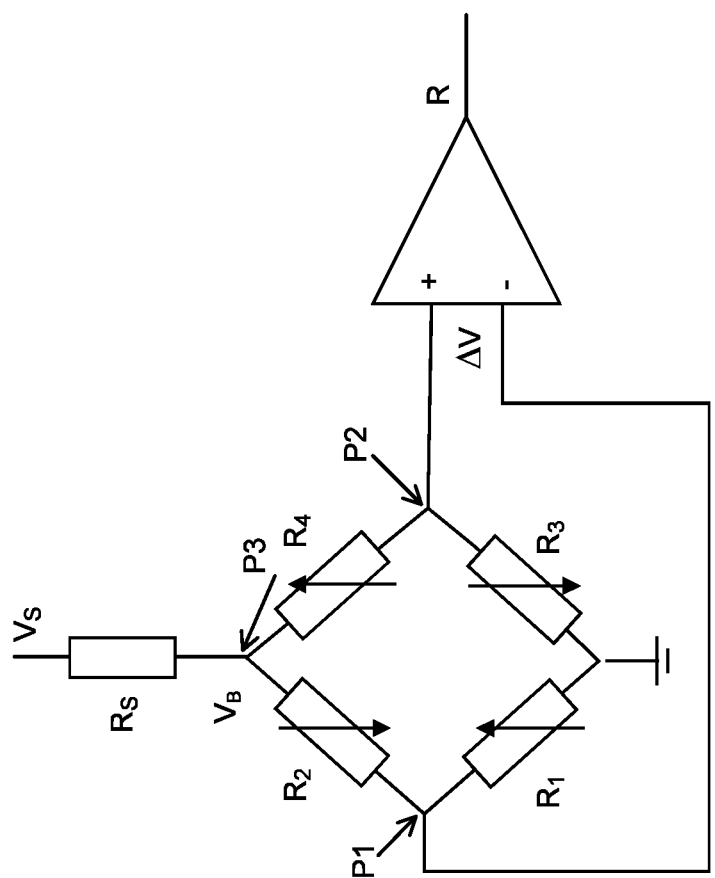
FIG. 10 shows a Wheatstone bridge arrangement of strain gauge elements of two direction sensitive strain gauges.

FIG. 10 shows a Wheatstone bridge arrangement of strain gauge elements 48, 50 of two direction sensitive strain gauges 46A, 46B. Assigning the first strain gauge element 48 of the first direction sensitive strain gauge 46A to the resistance R1, the second strain gauge element 50 of the first direction sensitive strain gauge 46A to the resistance R2, the first strain gauge element 48 of the second direction sensitive strain gauge 46B to the resistance R4, and the second strain gauge element 50 of the second direction sensitive strain gauge 46A to the resistance R3, the first and second direction sensitive strain gauges 46A and 46B are preferably connected in a Wheatstone bridge configuration as shown in FIG. 10. Since the second strain gauge elements 50 of the first and second direction sensitive strain gauges 46A and 46B measure strain with opposite signs, R2 and R3 change the value in opposite directions. This arrangement therefore strongly reduces or even cancels changes in the output voltage ΔV. Therefore, a signal neutral bending surface or plane 52 is a surface or plane at which side loads perpendicular to the signal neutral bending surface or plane 52 e.g. in the direction of D2, act without significant influence on the sensor output. The sensor output voltage is proportional to ΔV measured between connection points P1 and P2, and is given by $$\frac{\Delta V}{V_b} = \frac{V_p - V_n}{V_b} = \frac{R_1}{R_1 + R_2} - \frac{R_3}{R_3 + R_4}$$

$V_b$ being the voltage measured in connection point P3 and $V_p$, $V_n$ being the voltages measured in points P1, P2.

As will be discussed below, the directions of forces acting on the sensor 16 can be estimated in advance and the sensor 16 can be rotated such that the signal neutral bending surface or plane 52 is oriented perpendicular to side loads which may result in a parasitic moment.

The above concept works particularly well when the second line segment 94 of each the first one of the two direction sensitive strain gauges 46A, 46B is oriented essentially parallel to the second line segment 94 of the second one of the two direction sensitive strain gauges 46B and the second strain gauge element 50 of one of the two direction sensitive strain gauges 46A, 46B is placed on or is extending essentially only on one side of the signal neutral bending surface or plane 52 and the second strain gauge element 50 of the other one of the two direction sensitive strain gauges 46A, 46B is placed on or is extending essentially only on the other side of the signal neutral bending surface or plane 52. Even if parasitic forces act perpendicular to direction D2, due to the symmetric placement of both strain gages 46A and 46B (for example symmetric with respect to a centre of the force sensing plate 28), the sensor output will not change.

In order to further reduce the influence of strain generated by forces with components acting parallel to D2, each or at least one direction sensitive strain gauge 46A, 46B or a strain gauge 30 is positioned between at least two groove sections 54A, 54B formed in the force sensing plate 28 as shown in FIG. 9. The least two groove sections 54A, 54B are essentially parallel to the strain gauge alignment line 96. The groove sections 54A, 54B are essentially parallel to another. The groove sections 54A, 54B significantly reduce an amount of strain directed parallel or antiparallel to D2 reaching the strain gauge 30, 46A, 46B positioned between at least two groove sections 54A, 54B.

A length of at least one of the at least two groove sections 54A, 54B is preferably larger than the extension of the at least one of the direction sensitive strain gauges 46A, 46B, in particular by at least a factor of 3.

Furthermore, as shown in FIG. 9, the at least one strain gauge 30 or at least one direction sensitive strain gauge 46A, 46B can be placed within a region essentially surrounded by a circumferential groove 70 formed in the force sensing plate 28, in order to reduce a negative influence of a side load and a parasitic moment on the measurement of the sensor and to increase a signal amplitude obtainable from the sensor and to improve non-linearity of the signal.

In a preferred embodiment, the monitoring device 156 further comprises a wireless communication unit (not shown) adapted to transmit data representative of a sensor value measured by the sensor 16. In addition, the monitoring device 156 can comprise an internal power supply unit, e.g., a battery (not shown).

As mentioned above, the semitrailer 12 comprises at least one monitoring device 156, preferably at least one monitoring device 156 as described above, wherein the monitoring device 156 is adapted to transmit data representative of a sensor value measured by the sensor 16. The sensor value can represent a force measured by the sensor 16. Even though, in FIG. 1, the semitrailer 12 represents a load carrier vehicle, the load carrier vehicle can e.g. be a commercial vehicle, a truck 10, a towing vehicle 10, a trailer, or a swap body 154 for a commercial vehicle.

In the following, positioning of sensors 16 in a load carrier vehicle 10, 12 will be discussed.

Figure 11:
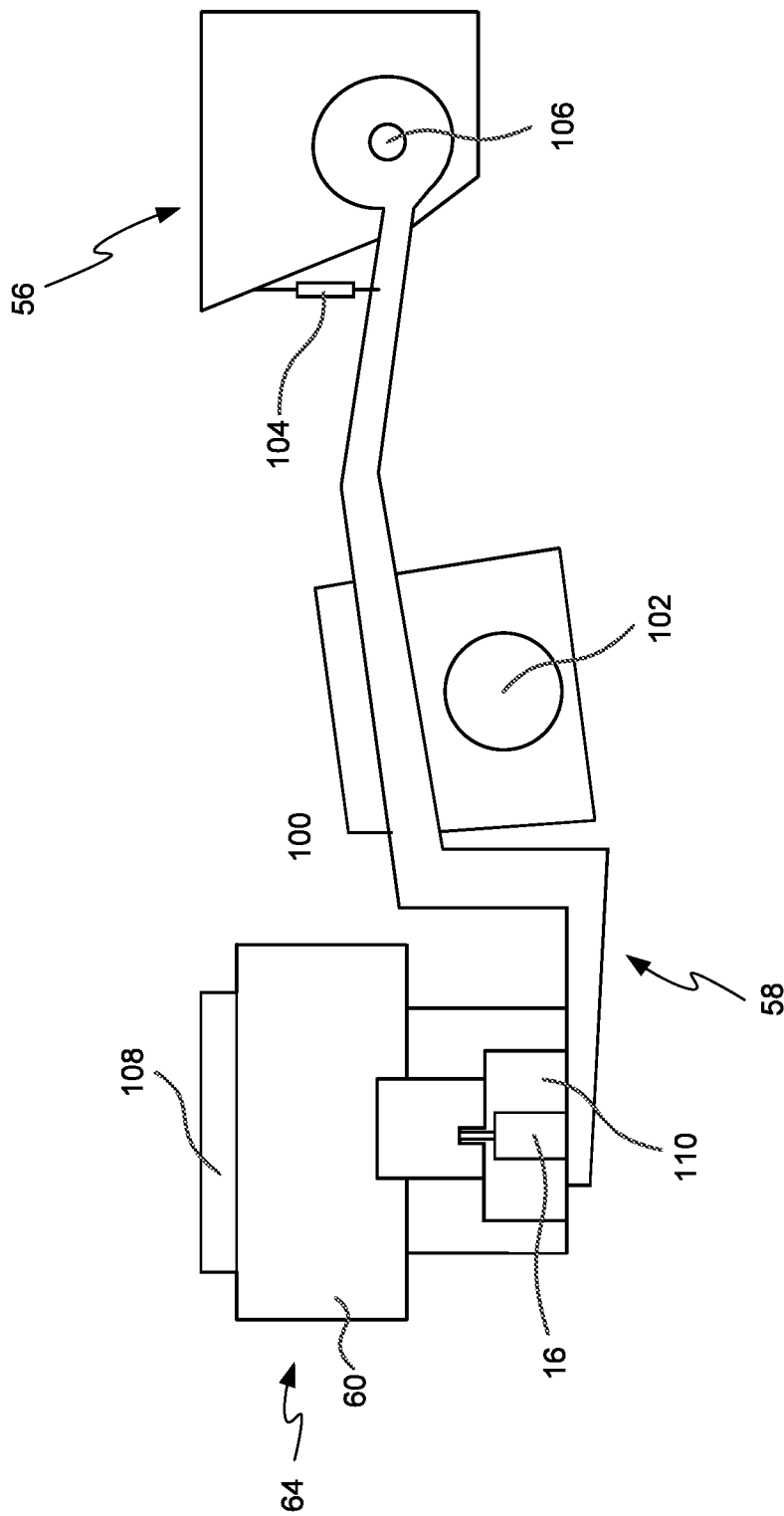
FIG. 11 shows schematically a load carrier vehicle suspension unit with partial cross-sections.
Figure 12:
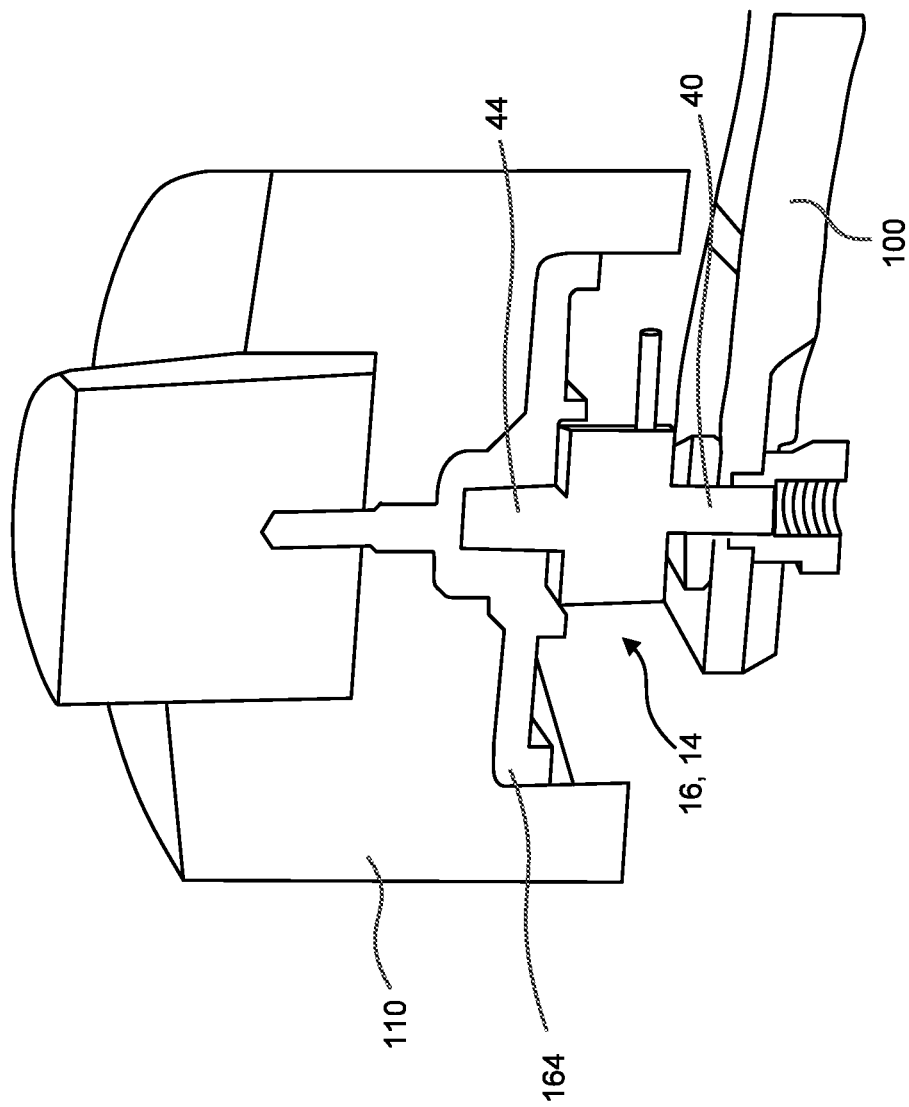
FIG. 12 shows schematically a cross-section of a portion of the load carrier vehicle suspension unit.

FIG. 11 shows schematically a load carrier vehicle suspension unit 58 with partial cross-sections and FIG. 12 shows schematically a cross-section of a portion of the load carrier vehicle suspension unit 58. In a preferred embodiment shown in FIGS. 11 and 12, the semitrailer 12 comprises the load carrier vehicle chassis 56 and a load carrier vehicle suspension unit 58 fixed with respect to the load carrier vehicle chassis 56. The load carrier vehicle suspension unit 56 comprises an axle support element 100 mounted movably with respect to the load carrier vehicle chassis 56, and a flexible bellow structure 64 with a flexible bellow 60. The flexible bellow 60 is fillable with a compressible fluid in order to control the height difference between the load carrier vehicle chassis 56 and the axle 102 and furthermore preferably to act as an air spring. A height difference between the load carrier vehicle chassis 56 and the axle 102 can be derived from an output of a height sensor 104 positioned between the axle support element 100 and the load carrier vehicle chassis 56 or by measuring an angular position of the axle support element 100 at its pivot point 106 on the load carrier vehicle chassis 56.

The flexible bellow structure 64 is mounted between the axle support element 100 and the load carrier vehicle chassis preferably by means of a bellow-chassis adapter element 108, connecting the bellow 60 with the load carrier vehicle chassis 56 and an adapter element 110 provided at the end of the bellow 60 facing the axle support element 100. The monitoring device, at least the sensor 16 of the monitoring device, is positioned in a force transmission path between the adapter element 110 and the axle support element 100. The sensor 16 can be mounted using the screw 44 on the adapter element 110 and using the screw 40 on the axle support element. The axle support element is preferably an axle support arm mounted rotatably with respect to the load carrier vehicle chassis 56. The adapter element 110 can be strengthened by comprising an adapter element 164 made of steel distributing forces transferred by screw 44 over a large area.

The main contribution of forces acting on the sensor 16 can be determined based essentially on a geometry of the load carrier vehicle suspension unit 58, allowing an arrangement of the sensor 16 to reduce an influence of a side load or a parasitic moment without extensive additional measurements.

Figure 13:
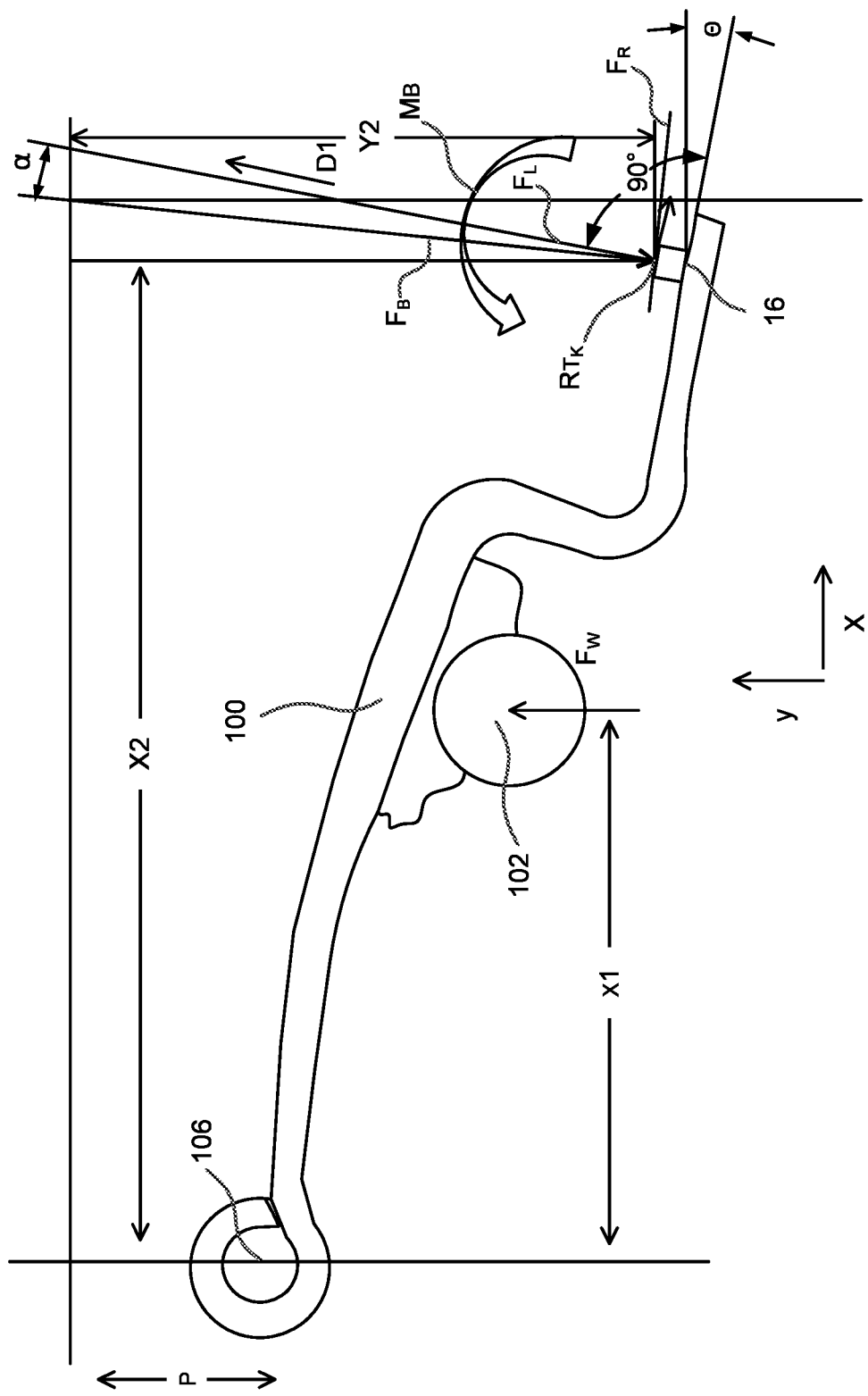
FIG. 13 shows schematically a load carrier vehicle suspension unit with indicated acting forces.

FIG. 13 shows schematically a cross-section of a portion of the load carrier vehicle suspension unit 56 with the axle support element 100 provided pivotable about its pivot point 106. The axle support element 100 supports an axle 102. A sensor 16 is mounted on the axle support element 100. An angle φ represents an angle between a surface of the road and a surface perpendicular to a first sensing direction D1 described below. An angle α represents an angle between the force $F_B$ and the first sensing direction D1. $F_L$ is a force parallel to the first sensing direction D1 and $F_R$ is a force perpendicular to the first sensing direction D1. $F_L$ and $F_R$ are a vector decomposition of $F_B$, $F_B$ being a weight transferred by the adapter element 110 to the sensor 16, such that as vectors $F_B = F_L + F_R$. $M_B$ represents a parasitic moment introduced by the bellow.

As can be seen in FIG. 12, in case the load carrier vehicle suspension unit 58 comprises the axle support arm mounted rotatably with respect to the load carrier vehicle chassis 56, the side load on the sensor 16 originates from the vector decomposition of the weight $F_B$ transferred by the adapter element 110 and furthermore from the bellow 60 being tilted by the rotation movement of the axle support arm. It has been found that both these side loads are directed essentially in the same direction $F_R$. Measurements and calculations show that the influence of these side loads and resulting parasitic moments on the output of the sensor 16 can be neglected, when the signal neutral bending surface or plane 52 of the sensor 16 is oriented perpendicular to the direction $F_R$.

In other words, the sensor 16 has the first sensing direction D1 oriented perpendicular to the force sensing plate 28 where the sensitivity of the sensor is high and has a second sensing direction, perpendicular to the signal neutral bending surface or plane 52, where the sensitivity of the sensor is low or zero. In particular, the sensitivity of the sensor 16 can have its maximum in the first sensing direction and its minimum in the second sensing direction. The sensitivity can be understood as a magnitude of an output signal of the sensor as a function of the force, e.g. a standard force magnitude, applied respectively in the first or second direction. The high sensitivity along the first sensing direction D1 results from both first strain gauge elements 48 of the strain gauges 46A, 46B sensing a strain with the same sign, when the force sensing plate 28 is flexed parallel or anti-parallel to D1. The low sensitivity along the second sensing direction results from each of the second strain gauge elements 50 of the strain gauges 46A, 46B sensing respectively strains with opposite sign, when a force parallel or anti-parallel to D2 acts on the force sensing plate 28. These effects result from the connection of the first and second strain gauge elements 48, 50 of the strain gauges 46A, 46B in a Wheatstone bridge arrangement as described above with respect to FIG. 10.

Figure 14:
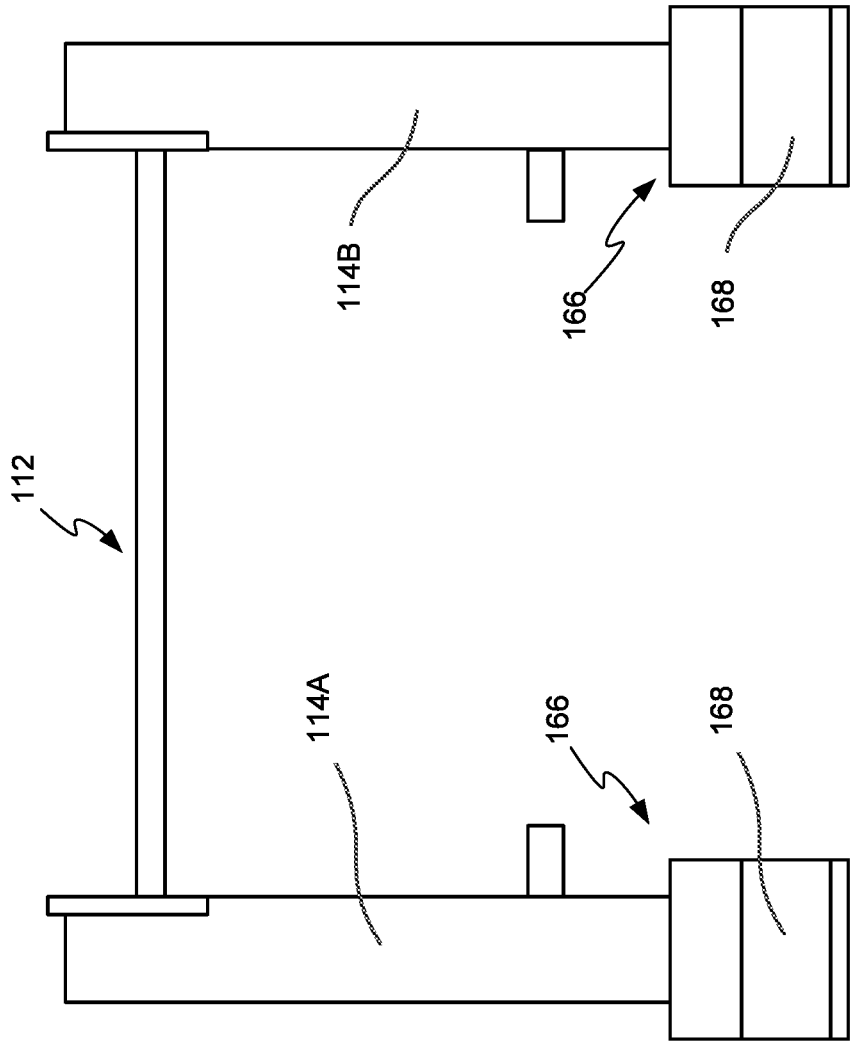
FIG. 14 shows schematically side views of a landing gear.
Figure 14:
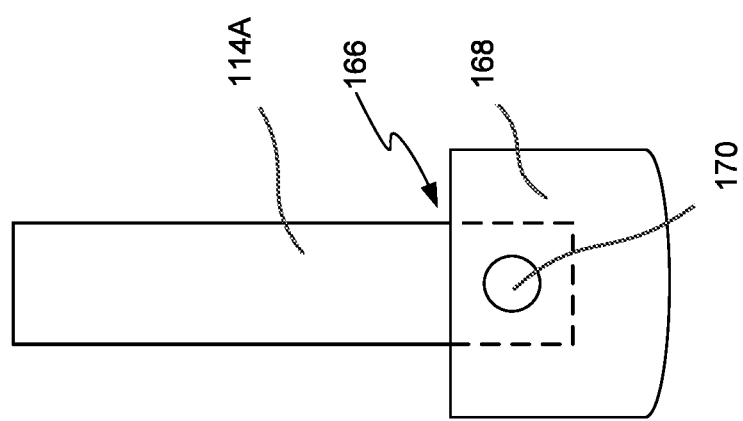
Figure 15:
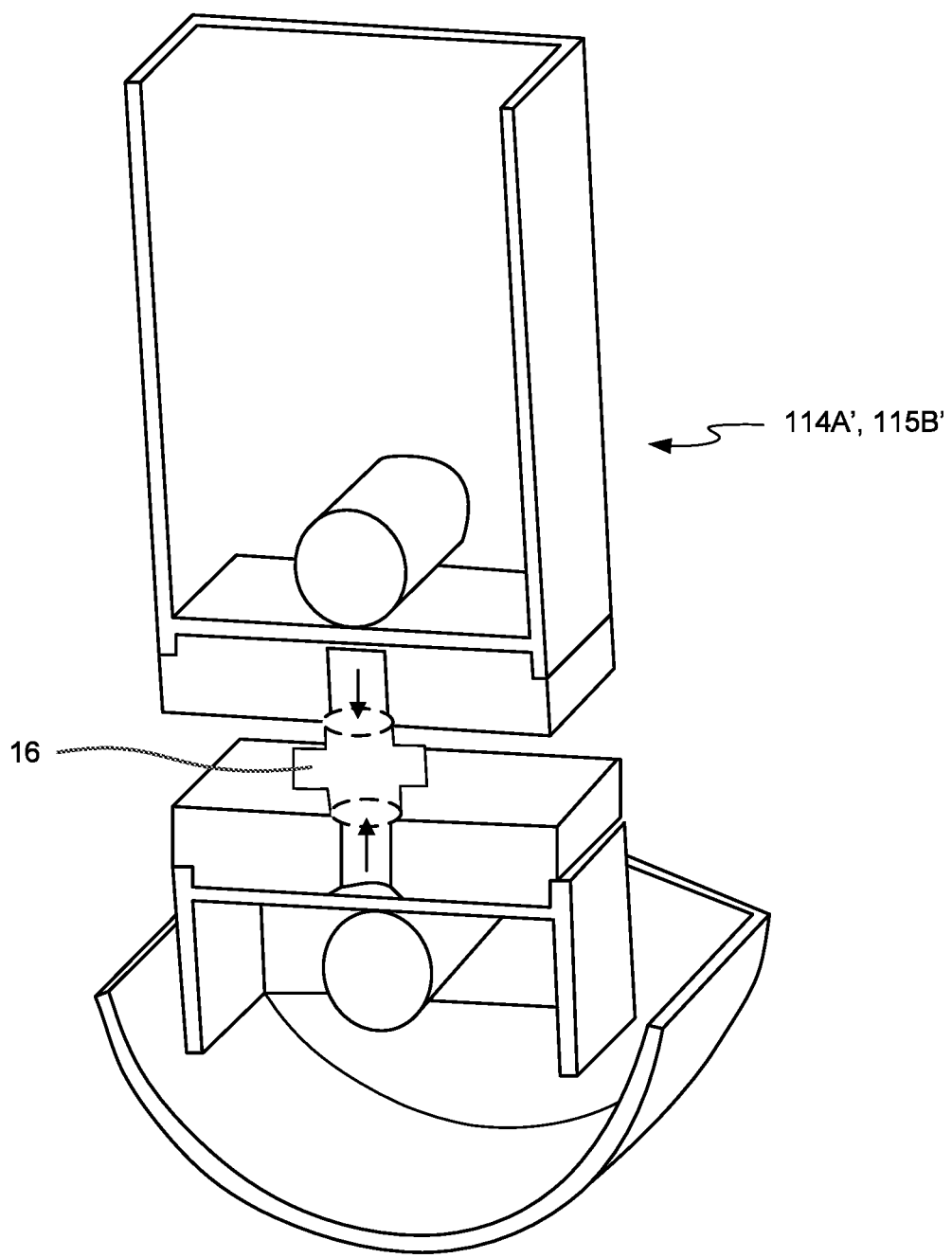
FIG. 15 shows schematically a cross section of a strut of a landing gear.

FIG. 14 shows schematically side views of the landing gear 112 and FIG. 15 shows schematically a cross section of a strut 114A, 114B of the landing gear 112. The semitrailer 12 is preferably provided with a landing gear 112 shown in FIG. 14 which is an embodiment of a load carrier vehicle support element. When the semitrailer 12 it is not coupled to the truck 10, the landing gear 112 transfers at least a part of a weight of the semitrailer to a (road) surface as a surface bearing the load of the semitrailer 12. The landing gear 112 comprises preferably two struts 114A, 114B pointing towards the road surface. Preferably, each of the struts 114A, 114B can be lifted and lowered, such that its ends can be positioned on or lifted from the road surface. Each of the ends 166 of the struts 114A, 114B represents a contact portion of the load carrier vehicle support element. The end 166 can be provided with a levelling section 168 which is rotatably mounted on the strut 114A, 114B by means of an axle. The levelling section 168 is formed to adapt to the orientation of the road with respect to the strut 114A, 114B, when the end 166 is positioned on the road. Preferably, as shown in FIG. 14 in each of struts 114A', 114B' a monitoring device 156 as described above or at least the sensor of the monitoring device, e.g. a load cell or a sensor 16 is provided to measure the force transmitted through the corresponding strut 114A', 114B' to the road surface.

Figure 16A:
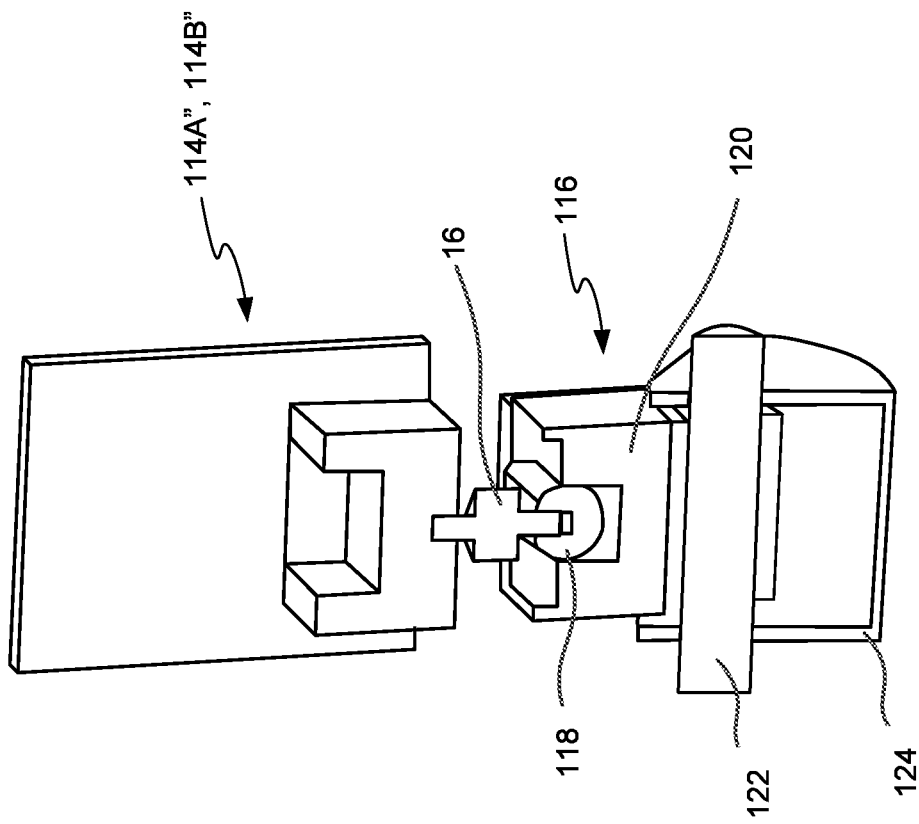
FIG. 16A shows schematically a cross section of a strut of a landing gear.
Figure 16B:
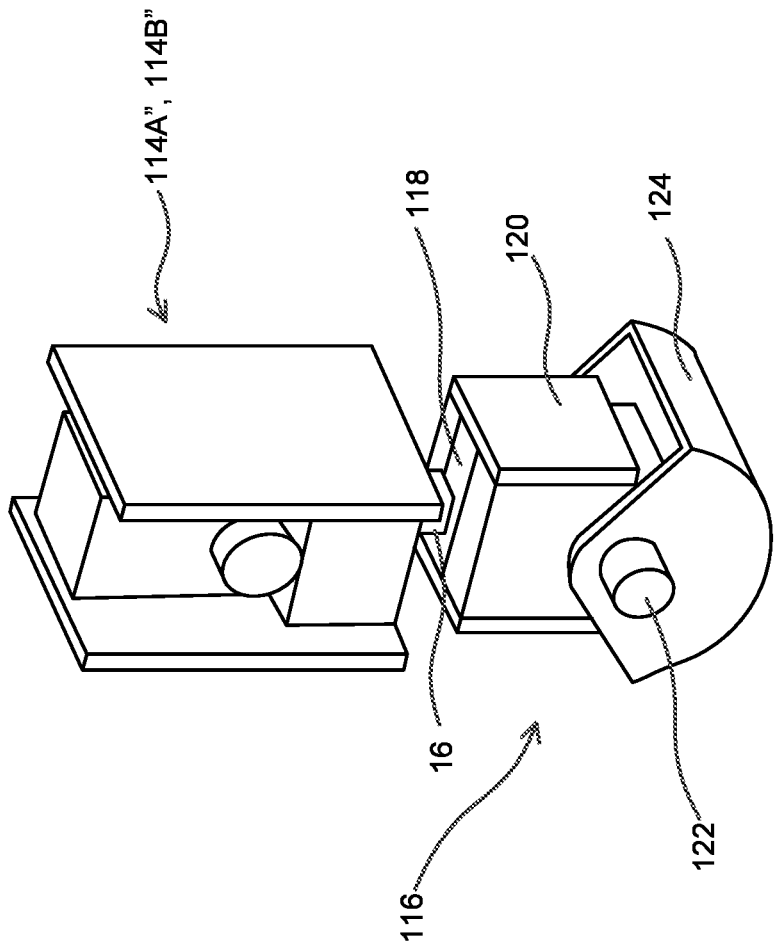
FIG. 16B shows schematically a side view of the strut shown in FIG. 16A.

FIG. 16A shows schematically a cross section of a strut 114A", 114B" of a landing gear and FIG. 16B shows schematically a side view of the strut 114A", 114B" shown in FIG. 16A. As shown in FIGS. 16A and 16B in a different embodiment of a landing gear, the sensor 16 is fixed at one end with respect to the respective strut 114A", 114B". The other end of the sensor 16 is provided with a levelling section 116 of the corresponding strut 114A", 114B". The levelling section 116 comprises a first axle 118 rotatably mounting an intermediate section 120 of the levelling section 116. The levelling section 116 preferably comprises a contact portion 124 preferably rotatably mounted with respect to the intermediate section 120 by means of a further axle 122 which is mounted in the intermediate section 120 preferably at an orientation perpendicular to the orientation of the axle 118. E.g. a projection of the first axle 118 on a plane perpendicular to the strut 114A", 114B" along the strut and a projection of the second axle 122 on the same plane along the strut 114A", 114B" are oriented perpendicular relative to each other. In this arrangement, forces can be measured in linearly independent multiple directions.

With this arrangement, the levelling section 116 provides the functionality of a ball joint and allows to reduce or even to eliminate a side load at the sensor 16 when the levelling section 116 is positioned on the road.

Figure 17A:
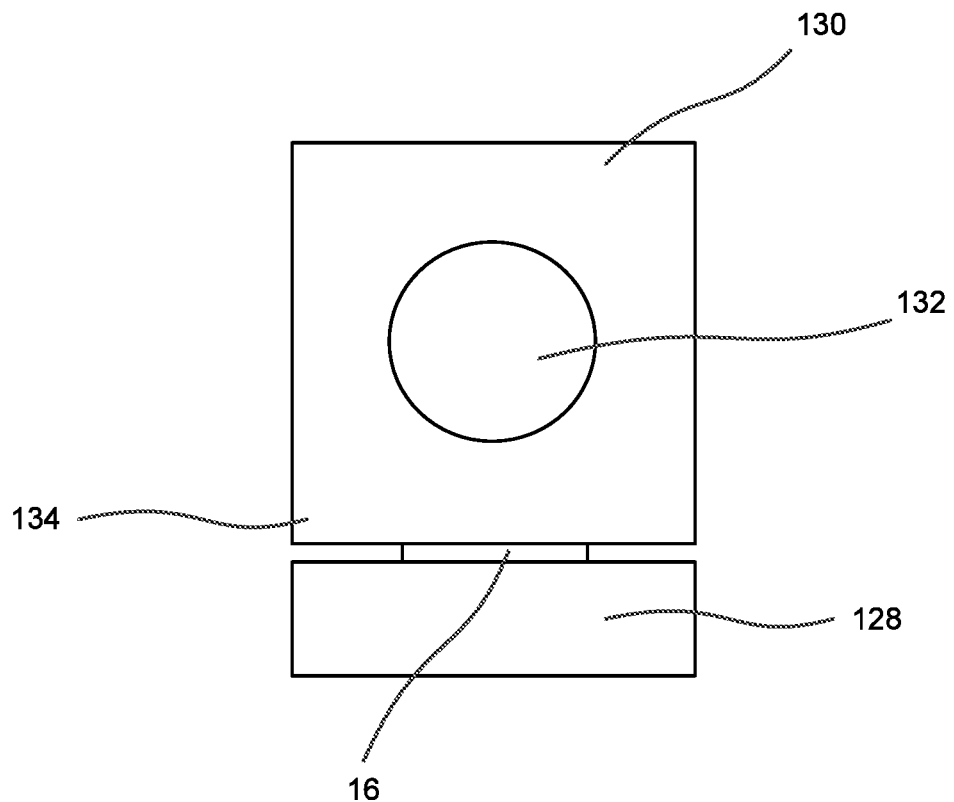
FIGS. 17A and 17B show schematically side views of a measurement section.
Figure 17B:
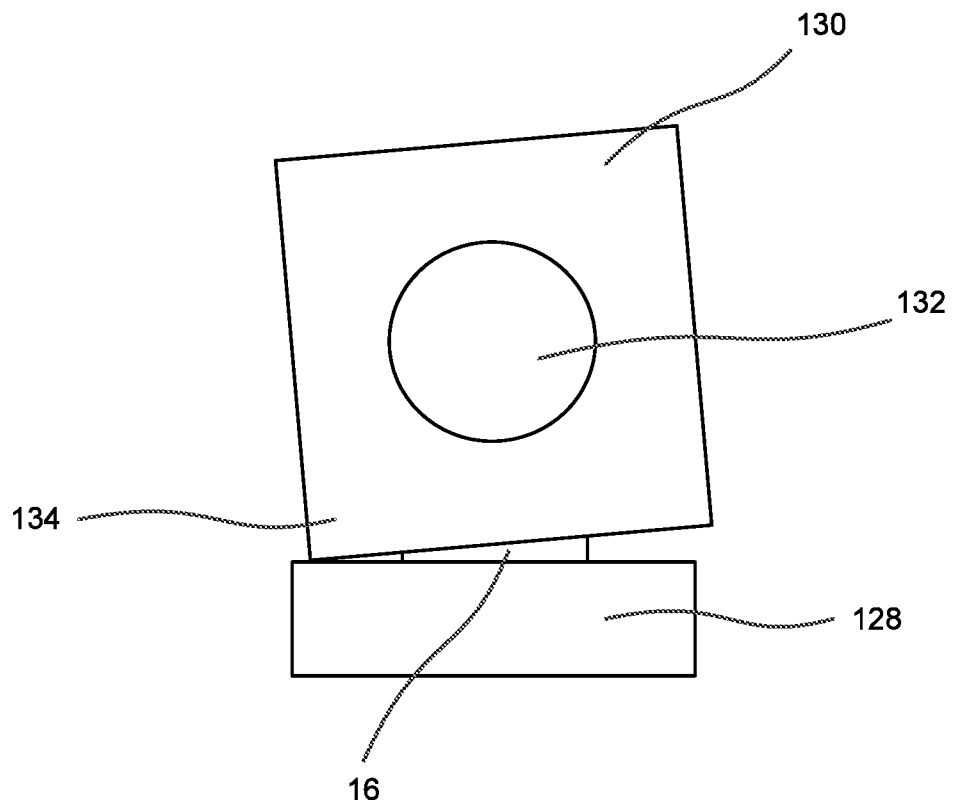
Figure 17C:
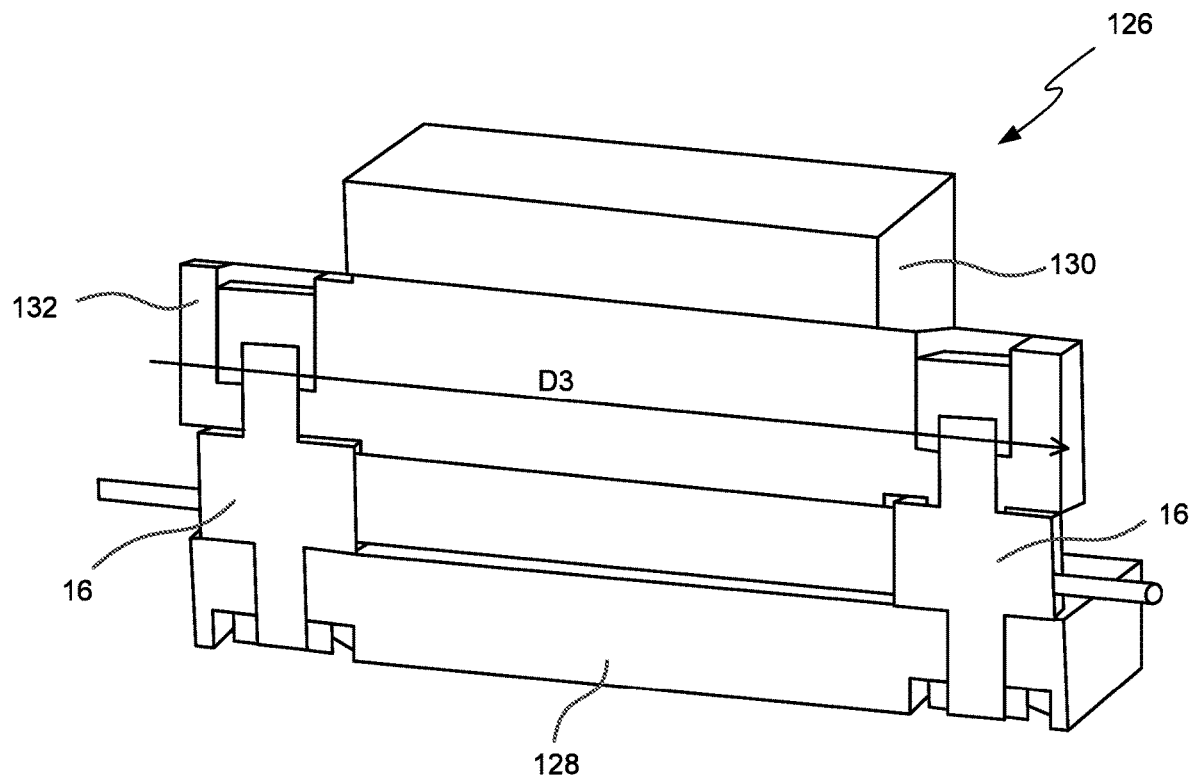
FIG. 17C show schematically a cross section of the measurement section shown in FIG. 17A.
Figure 18A:
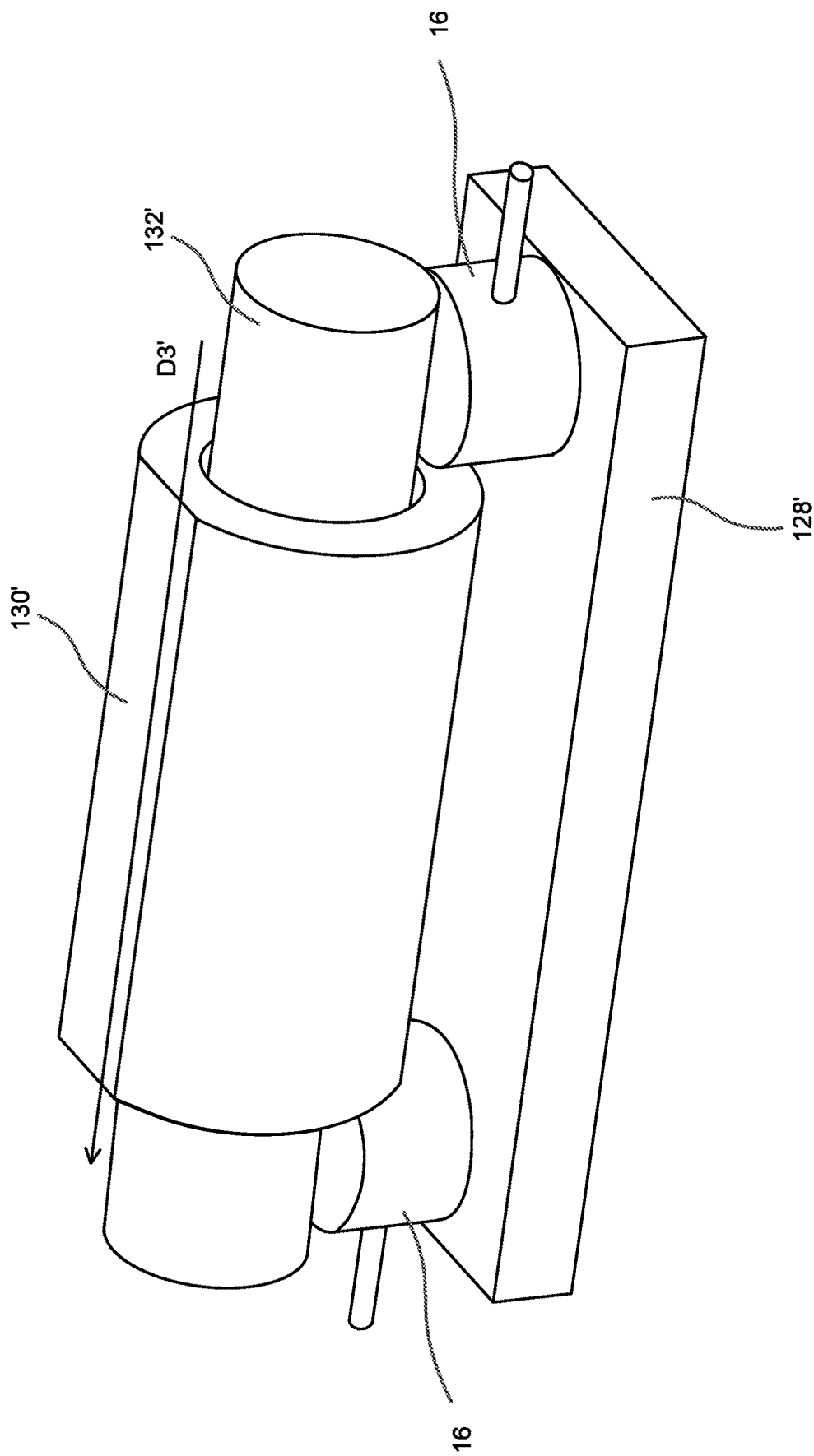
FIG. 18A shows schematically a side view of a measurement section.
Figure 18B:
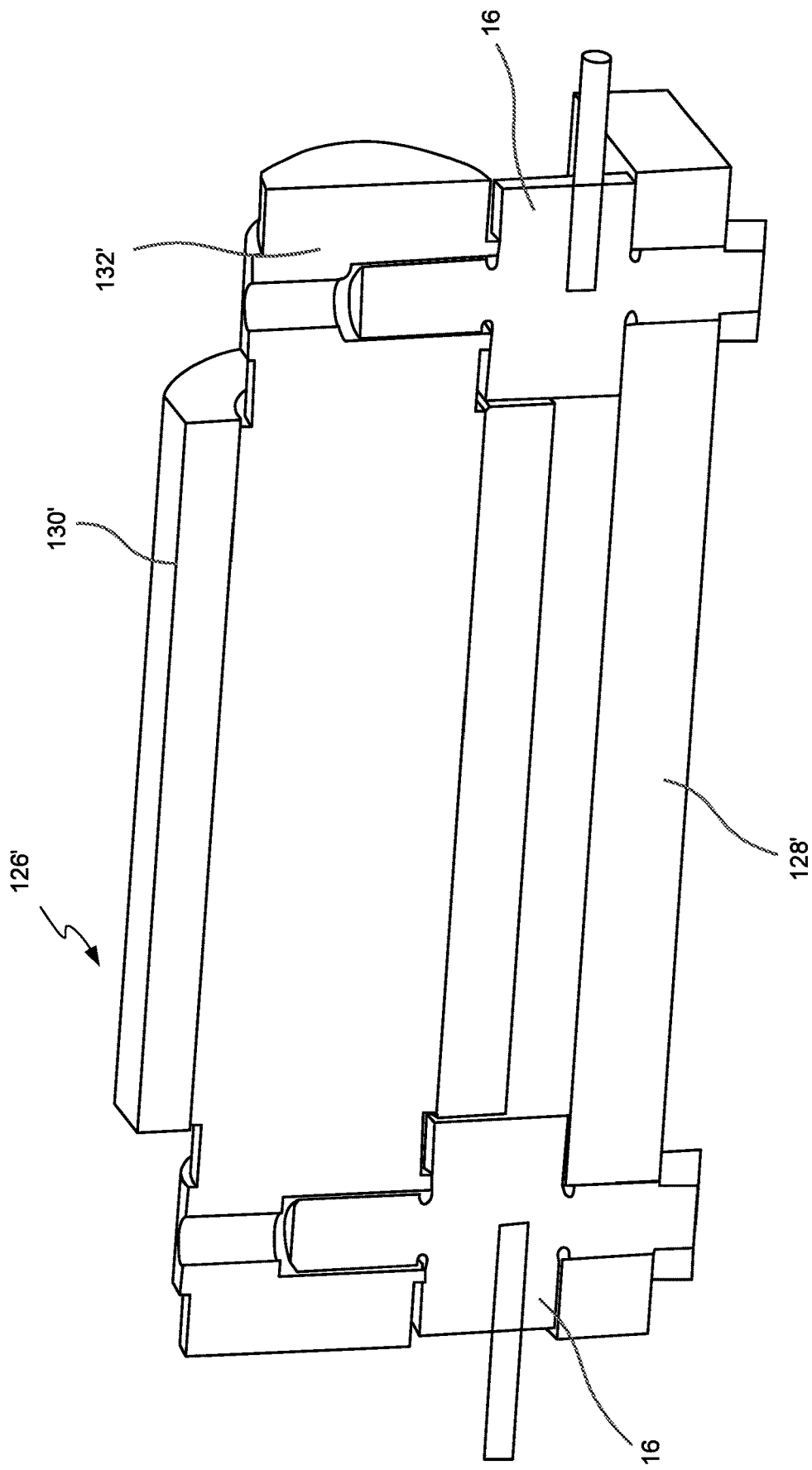
FIG. 18B shows schematically a cross section of the measurement section shown in FIG. 18A.

FIGS. 17A and 17B show schematically side views of a measurement section 126 and FIG. 17C show schematically a cross section of the measurement section 126 shown in FIG. 16A. FIG. 18A shows schematically a side view of a measurement section 126" and 18B shows schematically a cross section of the measurement section 126" in FIG. 18A. In an alternative embodiment of a landing gear partially shown in FIGS. 16A to 16C, a measurement section 126 can be fixed on the levelling section 168 provided on a respective strut 114A, 114B of the landing gear 112. This embodiment can be formed by retrofitting a landing gear of a semitrailer with the measurement section 126. The measurement section 126 can be connected via screws to the levelling section 168 provided on the respective strut 114A, 114B of the landing gear 112. However, the measurement section 126 can also be placed as a separate object underneath the levelling section 168 of the respective strut 114A, 114B during loading of the semitrailer 12. The measurement section 126 preferably comprises a baseplate 128, at least one, preferably two load cells, e.g sensors 16, each connecting one end to the baseplate 128 to an end of an axle 132, and a force transmitting block 130 which is preferably rotatably mounted on the axle 132. The force transmitting block 130 is preferably connected to a levelling section 168 provided on the respective strut 114A, 114B of the landing gear 112. For the analogous reasons as described above with respect to FIG. 12, each of the sensors 16 is preferably oriented with the signal neutral bending surface or plane 52 essentially parallel to an extension direction D3 of the axle 132. By doing so it is prevented that sensors 16 are loaded outside their center line which can cause high signal error. In order to protect the sensors 16 of the measurement section 126, the force transmitting block 130 can comprise an abutment section 134 abutting the baseplate 128 in case of excessive tilt of the force transmitting block 130 about axle 132. As shown in the alternative embodiment of FIGS. 18A and 18B, a force transmitting block 130' of a measurement section 126' can be formed without abutment sections 134'. The further elements and aspects of measurement section 126', e.g. a baseplate 128', at least one, preferably two load cells, e.g. sensors 16, and an axle 132', correspond to elements of the measurement section 126 and an arrangement of these elements of the measurement section 126' correspond to an arrangement of the corresponding elements of the measurement section 126, such that a further description is omitted and reference is being made to the description of the measurement section 126. In particular, baseplate 128' corresponds to baseplate 128; axle 132' corresponds to axle 132; the two load cells, e.g. sensors 16, shown in the embodiment shown in FIGS. 18A, 18B, correspond to the two load cells, e.g. sensors 16, in the embodiment shown in FIGS. 17A to 17C, and direction D3' corresponds to direction D3.

Figure 19:
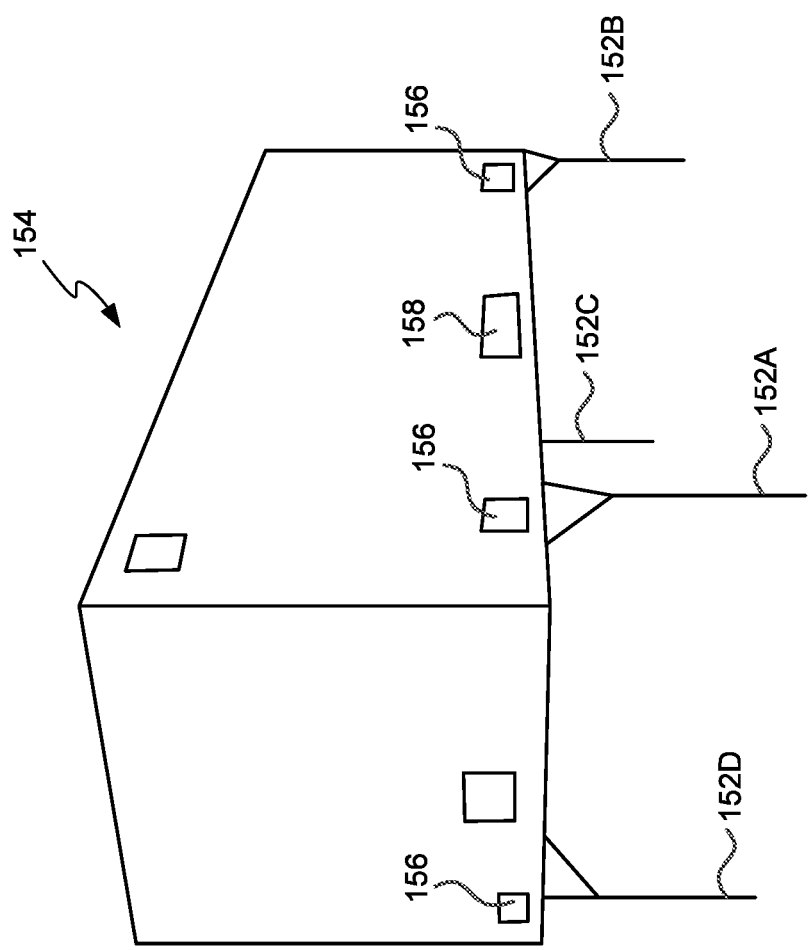
FIG. 19 shows a swap body.

FIG. 19 shows a swap body 154. The concept described with respect to the landing gear 112 can also be applied to struts 152A-152D of the swap body 154 shown in FIG. 19 with each of the struts 152A-152D having essentially the same configuration as (one of) the struts 114A, 114B. In particular, each of the struts 152A-152D can comprise a monitoring device, a levelling section 116 or a measurement section 126 as described above.

In the above description, devices for transfer and measurement of weight of a load carrier vehicle to a surface bearing the load carrier vehicle have been described. However, when the struts 114A, 114B of the landing gear 112 are lifted from the street and the semitrailer 12 is coupled to the truck 10 via the kingpin 78 and the fifth wheel 74, weight from the semitrailer 12 is transferred to the truck 10, and thus from one load carrier vehicle to another load carrier vehicle. A concept for providing sensors and monitoring devices in such a scenario will be discussed next.

In order to transfer weight from the semitrailer 12 to the truck 10, the semitrailer 12 can comprise the load transferring plate 76, transmitting load of the semitrailer 12 to the fifth wheel 74 of the truck 10. The load transferring plate 76 can be provided with at least one load cell, preferably with at least one sensors 16 measuring the force transferred from the load transferring plate 76 to the load carrier vehicle chassis 56.

Figure 20:
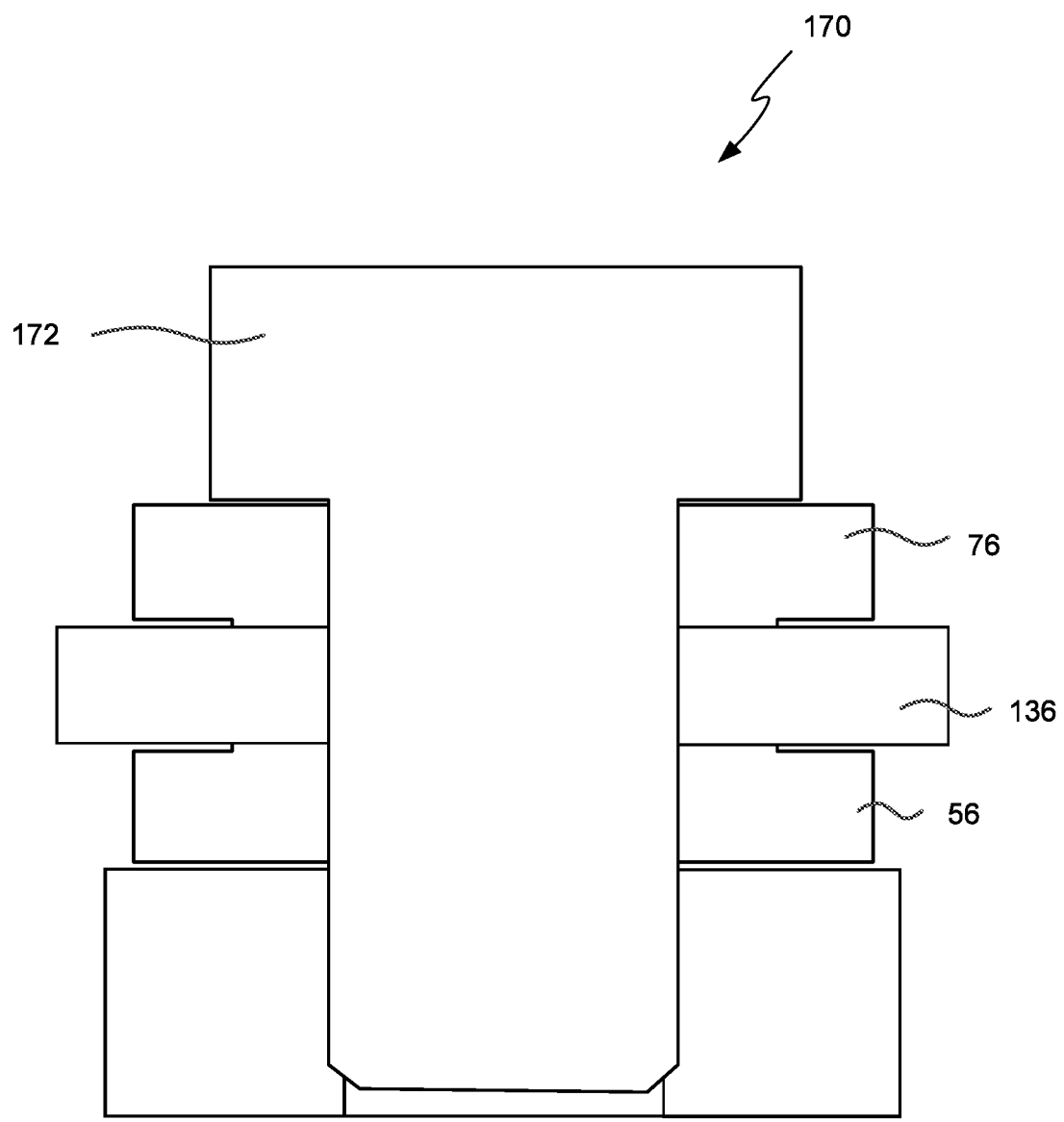
FIG. 20 shows schematically an embodiment of a sensor.
Figure 21:
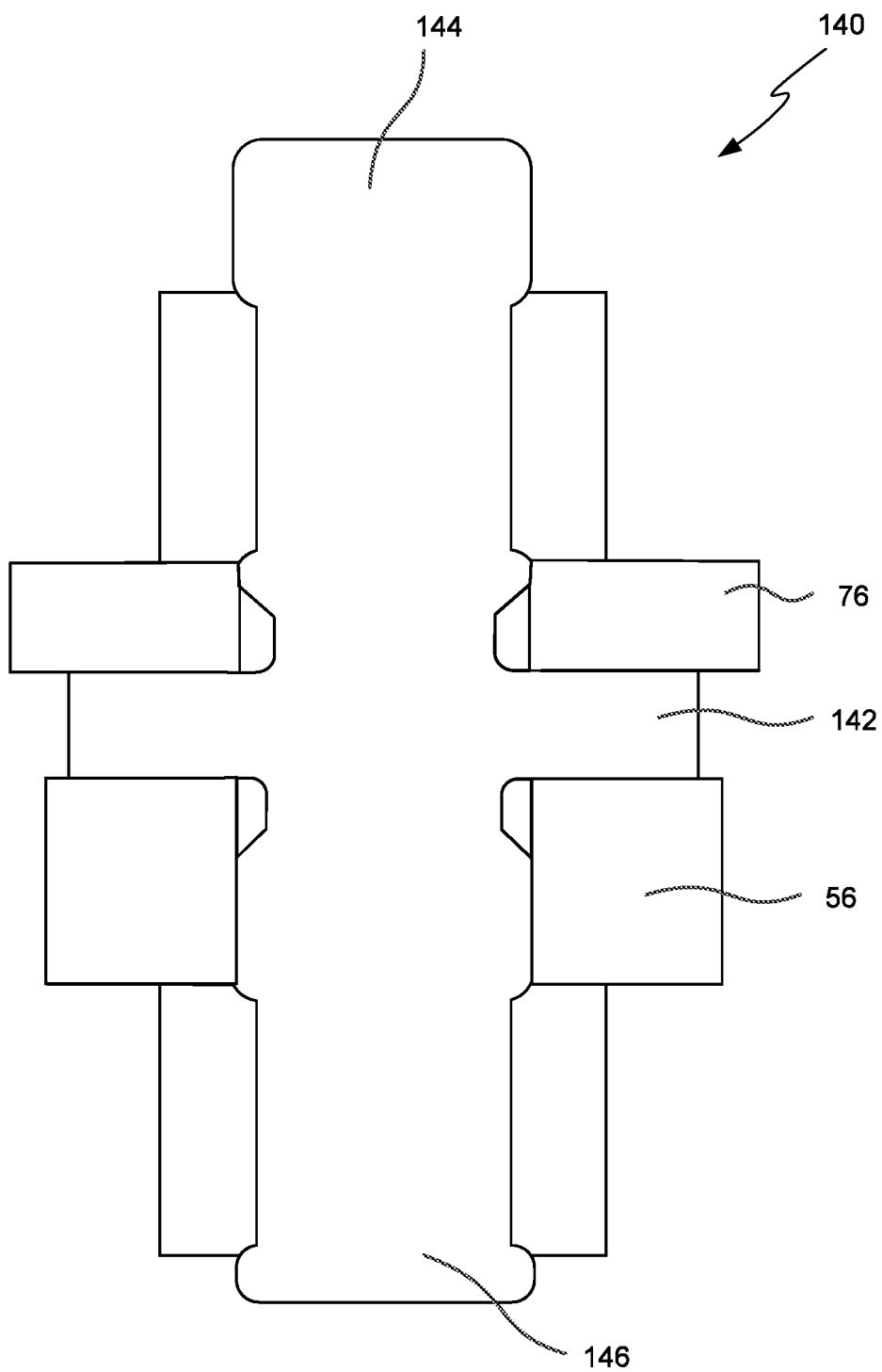
FIG. 21 shows schematically an embodiment of a sensor.

FIGS. 20 and 21 schematically show embodiments of a sensor. The at least one load cell can be provided in a form of a so-called doughnut force sensor 136 shown in FIG. 20 or a so-called bolt force sensor 140 shown in FIG. 21. The doughnut force sensor 136 has a shape of a washer and can be provided as a washer between the load transferring plate 76 and the load carrier vehicle chassis 56 in a screw connection 170. The doughnut force sensor 136 is adapted to measure a force acting on the doughnut force sensor 136 in the extension direction of a bolt 172 of the screw connection 170.

The bolt force sensor 140 comprises a load cell in a shape of the washer 142 with attached connection bolts 144, 146. These connection bolts can be used to connect the load transferring plate 76 to the load carrier vehicle chassis 56. Data representing sensor values of the doughnut force sensor 136 and the bolt force sensor 140 can be transferred to the load carrier vehicle hub.

The force transferred to the truck 10 by the load transferring plate 76 can also be measured on the fifth wheel 74 or on its holding structure 148A, 148B, using a load cell, again preferably using a so-called doughnut force sensor 136 or a so-called bolt force sensor 140 in screw connections 72A, 72B of the holding structure 148A, 148B with a truck chassis 150A, 150B. The positioning of the doughnut force sensor 136 or the bolt force sensor 140 in screw connections 72A, 72B is analogous to the positioning of these sensors shown in FIGS. 20 and 21. Data representing sensor values of the doughnut force sensor 136 and the bolt force sensor 140 used in screw connections 72A, 72B can be transferred to the load carrier vehicle hub 158, in particular the load carrier vehicle hub 158 of the semitrailer 12, directly or indirectly.

Each of the above described monitoring devices 156 is preferably adapted to transmit data representative of the sensor value measured by the sensor 16 wirelessly. The semitrailer 12 can further comprise the load carrier vehicle hub 158 which is preferably adapted to receive the data from at least one, preferably multiple or all monitoring devices 156 of the load carrier vehicle system wirelessly. The load carrier vehicle hub 158 can be adapted to determine a first quantity based on the data from at least one, preferably multiple, monitoring devices 156. Furthermore, the monitoring device 156 can be adapted to transmit the data representative of the sensor value measured by the sensor continuously, periodically or on demand, allowing an adaption of wireless data transmission to the power source available to the monitoring device. The monitoring device is preferably provided with an internal power supply unit, in particular a battery.

When the load carrier vehicle system comprising the truck 10 and the semitrailer 12 is loaded, flexible bellows 60 will have a modified shape resulting e.g. in movement of the kingpin 78 with respect to the fifth wheel 74. This movement may introduce a side load transferred to the sensors 136 or 140 used in screw connections 72A, 72B or the screw connections fixing the load transferring plate 76 to the load carrier vehicle chassis 56 of the semitrailer 12. These side loads may negatively affect load measurements of the sensors 136, 140. A load carrier vehicle system adapted to overcome the problems associated with these side loads is discussed in the following.

Preferably, the load carrier vehicle system shown in FIG. 1 comprises a first load carrier vehicle 12 and a second load carrier vehicle 10, wherein the first load carrier vehicle 12 can be coupled (e.g. by coupling the kingpin 78 with the fifth wheel 74) mechanically to the second load carrier vehicle 10 to transmit an acceleration and/or deceleration force between the first load carrier vehicle 12 and the second load carrier vehicle 10.

The first load carrier vehicle 12 can be a semitrailer 12 as described above and the second load carrier vehicle 10 can be a truck 10 as described above. Alternatively, the first load carrier vehicle can be a combination 22 of a semitrailer 12 and a truck 10.

Preferably, the truck 10 comprises a second load carrier vehicle hub adapted to communicate data with the first load carrier vehicle hub, preferably wirelessly. The truck 10 can comprise a monitoring device, preferably as described above, in particular comprising the so-called doughnut force 136 or a so-called bolt force sensor 140 in screw connections 72A, 72B of the holding structure 148A, 148B with a truck chassis 150A, 150B. The monitoring devices preferably transfer data to second load carrier vehicle hub.

The semitrailer 12 can comprise an actuator 68 adapted to act between the semitrailer 12 and the truck 10 to transfer weight from the semitrailer 12 to the truck 10, when the actuator 68 is extended in a first state of the actuator 68. The actuator 68 can be supported either directly on the fifth wheel 74 or on the truck chassis. When the actuator 68 is contracted in a second state of the actuator 68, no load is transferred through the actuator 68 between the semitrailer 12 and the truck 10 since the actuator is not supported on the truck chassis. The actuator 68 is preferably provided with a load cell, preferably the sensor 16, to measure the weight transferred through the actuator 68 in the first state of the actuator 68. The load cell, preferably the sensor 16, can be part of a monitoring device as described above.

The actuator 68 separates in its first state a weight transfer arrangement comprising the fifth wheel 74 and the load transferring plate 76 such that no weight is transferred through the weight transfer arrangement in the first state of the actuator 68. The separation between the fifth wheel 74 and the load transferring plate 76 is preferably larger an the extension of the kingpin 78 from the load transferring plate 76 in a direction perpendicular to the load transferring plate 76, such that no side load is present on the kingpin introducing measurement errors. In the second state of the actuator 68 weight is transferred from the load transferring plate 76 to the fifth wheel 74, since the actuator is not separating the fifth wheel 74 and the load transferring plate 76.

The actuator 68 is preferably in its first state, when the semitrailer is loaded and a side load on the kingpin can be expected.

In an alternative embodiment, the actuator does not comprise a sensor, but acts in its first state on a sensor of a monitoring device, preferably of a monitoring device as described above, the sensor being mounted either on the truck 10 or the trailer 12. In an alternative embodiment the actuator can be part of the truck 10.

The following section discusses how weight measurements using the above described sensors or monitor devices can be used to obtain an overall mass of a load carrier vehicle, a mass of the load of the load carrier vehicle, a centre of gravity of the load carrier vehicle or a centre of gravity of the load of the load carrier vehicle.

The discussed method for monitoring a load carrier vehicle can relate to monitoring a truck, a towing vehicle, a semitrailer, a trailer or a swap body for a commercial vehicle.

The method preferably comprises the step of determining n partial weights $Fp_1$ to $Fp_n$ based on the at least one sensor values indicating a force. Preferably, each of the sensor values is provided by the sensor of the monitoring device described above, preferably the sensor 16. The n partial weights $Fp_1$ to $Fp_n$ are specified further below for particular conditions of the load carrier vehicle.

The load carrier vehicle can have n, n being a natural number, weight transfer portions through which load of the load carrier vehicle it is transferred to a surface bearing the load carrier vehicle. Such a weight transfer portions can be:
- the above described bellow structure 64 optionally with the associated sensor 16 (indicated for simplicity by reference signs 18A-18F),
- the strut 114A, 114B, 114A', 114B', 114A", 114B" of the landing gear 112 optionally with the associated sensor of a monitoring device (e.g. indicated for simplicity by reference signs 20A and 20B),
- the strut 152A-152D of the swap body 154,
- the load transferring plate 76 optionally with associated sensors of at least one monitoring device,
- the actuator 68 optionally comprising a sensor of a monitoring device (indicated for simplicity by reference sign 26), and the like. However, the associated sensor of a monitoring device for the load transferring plate 76 can be also placed on the truck 10, e.g. associated with the fifth wheel, while the load transferring plate 76 is part of a semitrailer. Also the sensor associated with the actuator 68 can be placed on the truck 10 or semitrailer 12.

Each of the weight transfer portions can be modelled as having an effective weight transfer position $Rt_1$ to $Rt_n$ in the concept of classical mechanics which reduces objects as well as regions, forces are acting on, to points. In particular, the effective weight transfer position can be, in case the sensor 16 is being used, defied by an intersection of a central axle of connection port 36 of the force sensing plate 28 and a plane defined by an external surface of the force sensing plate 28, e.g. a surface of the force sensing plate 28 facing away from the counter acting plate 32.

In all weight transfer portions where weight is transferred, or in all weight transfer portions, at least one sensor value indicating a force is measured. Even if the sensor, like a load cell, outputs a value indicating a force acting on the sensor, the geometry of the arrangement needs to be considered when calculating the weight transferred: while the force transmitted through sensors 16 in FIGS. 14, 15A and 15B or through the actuator 68 can be directly used to obtain the weight transferred through the strut of the landing gear, the sum of the forces transferred through the two sensors 16 in FIG. 16C corresponds to the weight transferred through the strut of the landing gear.

Furthermore, when measuring the force by the sensor 16 mounted using screw 44 on the adapter element 110 and using screw 40 on the axle support element, the weight $F_W$ transferred to the axle associated with the weight transfer portion comprising the sensor 16 (and thus a partial weight transferred through bellow structure 64) can be obtained by the law of the lever:

$$F_W*x_1-F_B*\cos(\phi)*x_2-F_B*\sin(\phi)*(y_2-p)+F_R*\cos(\phi)*(y_2-p)-F_R*\sin(\phi)*x_2+M_b=0$$

$$F_B=F_L/\cos(\alpha)$$

$$F_W*x_1-F_L*[\cos(\phi)*x_2+\sin(\phi)*(y_2-p)]/\cos(\alpha)+F_R*[\cos(\phi)*(y_2-p)-\sin(\phi)*x_2]+M_b=0$$

$$F_W=F_L*g_1/x_1+F_R*g_2/x_1-M_b/x_1$$

$$g_1=[\cos(\phi)*x_2+\sin(\phi)*(y_2-p)]/\cos(\alpha). \quad g_2=\sin(\phi)*x_2-\cos(\phi)*(y_2-p)$$

with $F_L$ representing an axial load on the sensor, $F_R$ representing a radial parasitic load on the sensor, and Mb representing a parasitic moment on the senor. In the above formulas, X1 represents the distance in an X direction between the pivot point 106 and a centre of the axle 102; and X2 represents the distance in the X direction between the pivot point 106 and the sensor 16, in particular a weight transfer position $Rt_k$ within the sensor. P represents a distance between the pivot point 106 and a reference level of the load carrier vehicle chassis 56 in a Y direction; and Y2 represents a distance in a Y direction between the sensor 16, in particular a weight transfer position $Rt_x$ within the sensor, and a reference level of the load carrier vehicle chassis 56. The X direction is perpendicular to the Y direction and the X direction can be a horizontal direction, e.g. parallel to a surface bearing the load carrier vehicle. The angle $\phi$ represents an angle between a horizontal direction and $F_R$. The angle $\alpha$ represents an angle between the force $F_B$ and $F_L$. $F_B$ is the weight transferred by the adapter element 110 to the sensor 16.

A height difference between the load carrier vehicle chassis 56 and the axle 102 can be measured by a height sensor 104 between the axle support element 100 and the load carrier vehicle chassis 56 or by measuring an angular position of the axle support element 100 at its pivot point 106 with respect to the load carrier vehicle chassis 56. The height difference can be used to obtain the angular position of the axle support element 100 needed in the above calculations.

It is possible to measure all sensor signals associated with the weight transfer positions $Rt_1$ to $Rt_n$ and weight transfer portions with an empty load carrier vehicle and to calculate and save the corresponding partial weights $Fp_1$ to $Fp_n$ transferred through the weight transfer positions as partial weights $Fp_{1,empty}$ to $Fp_{n,empty}$ for an empty load carrier vehicle.

Furthermore, once the vehicle is loaded, it is possible to measure all sensor signals associated with the weight transfer positions and weight transfer portions and to calculate and to save the corresponding transferred weights as partial weights $Fp_{1,loaded}$ to $Fp_{n,loaded}$ for a loaded load carrier vehicle.

A weight $F_{wl}$ of the load of the load carrier vehicle can be calculated as follows:

$$F_{wl}=\sum_{i=1}^{n}\left(F_{p_i,loaded}-F_{p_i,empty}\right)$$

A mass $m_{load}$ of the load of the load carrier vehicle can be calculated as follows:

$$m_{load}=\frac{F_{wl}}{g}$$

with g representing the gravitational acceleration of earth. The method can comprise comparing a maximum allowable load/payload with the calculated mass of the load of the load carrier vehicle and optionally informing an operator of the load carrier vehicle about a result of this comparison.

A mass $m_{load\ carrier\ vehicle,\ empty}$ of the load carrier vehicle without any load can be obtained from parameters provided by the manufacturer and from a measurement of the level of fluids of the load carrier vehicle. The measurement of the level of fluids of the load carier vehicle allows to calculate the mass of the fluids of the load carrier vehicle.

Alternatively, an approximation of $m_{load\ carrier\ vehicle,\ empty}$ can be obtained by calculating $$F_{empty\ vehicle}=\sum_{i=1}^{n}F_{p_i,empty}$$

$$m_{load\ carrier\ vehicle,empty}\approx\frac{F_{empty\ vehicle}}{g}$$

This approximation does not include the mass of the load carrier vehicle position downwards from the weight transfer positions $Rt_1$ to $Rt_n$.

A mass $m_{load\ carrier\ vehicle,\ loaded}$ of the load carrier vehicle with load can be obtained by calculating the sum of $m_{load}$ and $m_{load\ carrier\ vehicle,\ loaded}$. In case the weight Fwc of the load carrier vehicle without any load is calculated based on parameters provided by the manufacturer and measurement of the level of fluids of the load carrier vehicle, the mass $m_{load\ carrier\ vehicle,\ loaded}$ can be calculated as follows:

$$m_{load\ carrier\ vehicle,loaded}=\frac{Fwc+Fwl}{g}$$

A force acting on an axle can be calculated as follows:

$$F_{Axle}=\left(\sum_{i:Rt_i\ is\ associated\ to\ axle}^{n}F_{p_i}\right)+F_{Axlecomponents}$$

wherein the condition i: $Rt_i$ is associated to axle defines all i's, for which the associated partial weights $Fp_i$ are transferred to the axle, which is analysed. Furthermore, since the axle load of a load carrier vehicle is e.g. the total weight felt by the road underneath the wheels of the axle, the force representing the weight $F_{Axlecomponents}$ of the axle with the wheels and suspension components not measured by the sensors and monitoring devices needs to be added. $F_{Axlecomponents}$ can be calculated on the basis of parameters provided by the manufacturer of the load carrier vehicle.

An axle load is often expressed as a mass and therefore can be calculated as $$m_{Axleload} = \frac{F_{Axle}}{g}$$

g representing the gravitational acceleration of earth. The method can comprise comparing an axle load limit with the calculated axle load and optionally informing the operator of the load carrier vehicle about a result of this comparison.

Furthermore, the method can comprise a step of determining n partial load weights $Fp_{i,load}$ i=1 . . . n $$F_{p_i,load} = (F_{p_i,loaded} - F_{p_i,empty})$$

Furthermore, the method can comprise determining n partial torques $Mp_1$ to $Mp_n$, each resulting from a respective partial load weight $Fp_{1,load}$ to $Fp_{n,load}$ acting on an associated effective weight transfer position $Rt_1$ to $Rt_n$:

$$M_{pi} = Rt_i \times F_{p_i,load}$$

with "x" representing the cross product.

Furthermore, the method can comprise determining a centre of gravity $Rcog_{load}$ of the load of the load carrier vehicle using the n partial torques $Mp_1$ to $Mp_n$, by solving the equation:

$$\sum_{i=1}^{n} M_{p_i} = Rcog_{load} \times F_{wl}$$

or $$\sum_{i=1}^{n} (Rt_i - Rcog_{load}) \times F_{p_i,load} = 0$$

Figure 22:
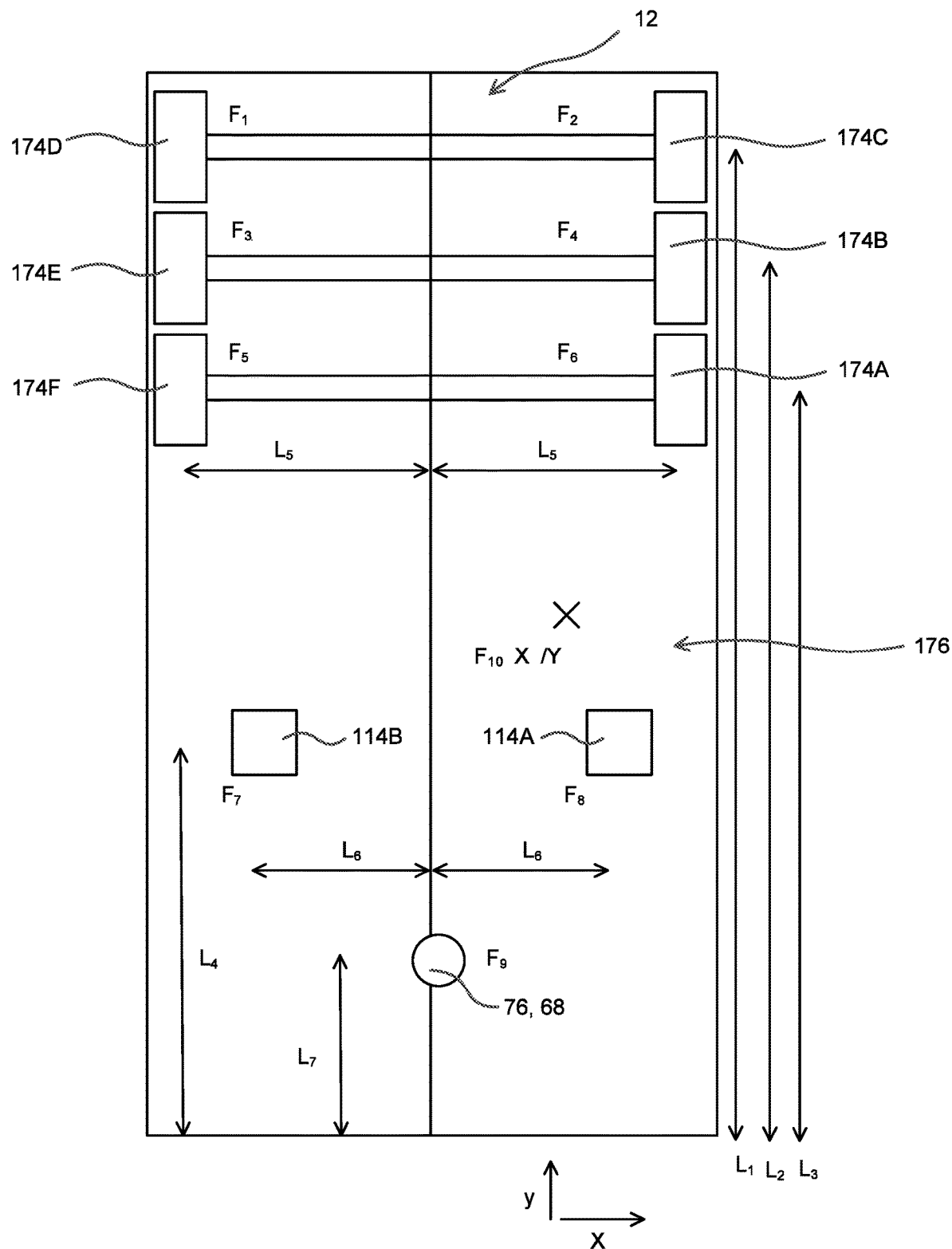
FIG. 22 shows schematically a top view of a semitrailer.

FIG. 22 shows schematically a top view of the semitrailer 12. For the sake of simplicity, the semitrailer 12 is represented by its wheels 174A-174F, its load surface 176, struts 114A, 114B of the landing gear 112 and the actuator 68 or the load transferring plate 76.

Since in the calculation of the cross product parallel components of the position $Rt_i$ with respect to the force acting in $Rt_i$ do not contribute to the result of the cross product, the following calculation can be made in order to obtain the centre of gravity With $F_1$ representing the partial weight transferred at position (−L5, L1) to a wheel;
With $F_2$ representing the partial weight transferred at position (L5, L1) to a wheel;
With $F_3$ representing the partial weight transferred at position (−L5, L2) to a wheel;
With $F_4$ representing the partial weight transferred at position (L5, L2) to a wheel;
With $F_5$ representing the partial weight transferred at position (−L5, L3) to a wheel;
With $F_6$ representing the partial weight transferred at position (L5, L3) to a wheel;
With $F_7$ representing the partial weight transferred at position (−L6, L4) to a strut of a landing gear;
With $F_8$ representing the partial weight transferred at position (L6, L4) to a strut of a landing gear;
With $F_9$ representing the partial weight transferred at position (0, L7) to the actuator 68 or the load transferring plate 76; and With $F_{10}$ representing the weight transferred to the surface. Terms in brackets like (A, B) refer to a position with X=A and Y=B, with a position (0,0) preferably representing a point in the middle of to the lower edge of the semitrailer 12 shown in FIG. 22.

Preferably, the expression weight and partial weight transferred refer to a weight of a load of a load carrier vehicle or partial weight of a load of a load carrier vehicle, such that for i=1 to 9 $F_i = F_{p_i,load}$.

$$F_1 + F_2 + F_3 + F_4 + F_5 + F_6 + F_7 + F_8 + F_9 = F_{10}$$

$$(F_1 + F_3 + F_5)*L_5 - (F_2 + F_4 + F_6)*L_5 + F_7*L_6 - F_8*L_6 + F_{10}*X = 0$$

$$(F_1 + F_2)*L_1 + (F_3 + F_4)*L_2 + (F_5 + F_6)*L_3 + (F_7 + F_8)*L_4 + F_9*L_7 - F_{10}*Y = 0$$

Solution $$F_{10} = F_1 + F_2 + F_3 + F_4 + F_5 + F_6 + F_7 + F_8 + F_9$$

$$X = -\{(F_1 + F_3 + F_5)*L_5 - (F_2 + F_4 + F_6)*L_5 + F_7*L_6 - F_8*L_6\}/F_{10}$$

$$Y = \{(F_1 + F_2)*L_1 + (F_3 + F_4)*L_2 + (F_5 + F_6)*L_3 + (F_7 + F_8)*L_4 + F_9*L_7\}/F_{10}$$

with X being an X coordinate of a centre of gravity and Y being an Y coordinate of the centre of gravity. An X direction in FIG. 22 can be parallel to the arrow representing L6 and an Y direction in FIG. 22 can be parallel to the arrow representing L1.

In case a definition $F_i = F_{p_i,loaded}$ is used instead of the definition $F_i = F_{p_i,load}$ an approximation for the centre of gravity $Rcog_{vehicle\ with\ load}$ of the load carrier vehicle including the load of the load carrier vehicle can be obtained by the above solution. This approximation is not taking into account the extension and the weight of the axels and wheels.

Using m=mass of the load carrier vehicle including the load, ρ(r) being the mass density of the load of the load carrier vehicle and of the load carrier vehicle, $Rcog_{vehicle}$ being the centre of gravity of the load carrier vehicle without the load, the following equations can be obtained:

$$Rcog_{vehicle} = \frac{1}{m_{load\ carrier\ vehicle,empty}} \int_{vehicle} r\rho(r)dr$$

$$Rcog_{load} = \frac{1}{m_{load}} \int_{load} r\rho(r)dr$$

$Rcog_{vehicle\ with\ load} =$ $$\frac{1}{m} \int_{Vehicle\ with\ load} r\rho(r)dr = \frac{1}{m} \left( \int_{vehicle} r\rho(r)dr + \int_{load} r\rho(r)dr \right) =$$

$$\frac{m_{load\ carrier\ vehicle,empty}}{m} Rcog_{vehivle} + \frac{m_{load}}{m} Rcog_{load}$$

The respective integrals are being calculated over the space regions only containing the load carrier vehicle in $\int_{vehicle} r\rho(r)dr$; the space regions only containing the load in $\int_{load} r\rho(r)dr$ and the space region containing the load and the load carrier vehicle in $\int_{vehicle\ with\ load} r\rho(r)dr$.

Since $Rcog_{vehicle}$ can be calculated on the basis of parameters provided by the manufacturer of the load carrier vehicle and the fluid levels of the load carrier vehicle and a positioning of the fluids of the load carrier vehicle, and the further quantities can be calculated as described above, the centre of gravity of the vehicle with the load can be calculated as well using the method.

Throughout the above calculations, the n partial weights represent a part of the weight of the load of the load carrier vehicle and each partial weight is transferred through an associated weight transfer portion. This is also true due to the vector characteristics of forces in case the total weight transferred through the weight transfer portion is analysed.

It is important to understand that the present disclosure does not relate to the use of scales underneath each wheel of a load carrier vehicle and each strut of a supporting structure (e.g. the landing gear 112), therefore preferably at least one of the weight transfer portions is spaced from the surface bearing the load carrier vehicle. It is to be noted, however, that it is possible to provide separate scale like devices, like the measurement sections 126, in combination with measurement devices moving in unison with the load carrier vehicle within the scope of the present disclosure.

In a preferred embodiment, the method comprises further determining, with respect to at least one of the weight transfer portions, with respect to said weight transfer portion a first force direction, e.g. a direction of $F_L$, corresponding to a main weight transfer direction and determining, with respect to said weight transfer portion, a second force direction, e.g., a direction of $F_R$, transverse to the first force direction.

As described above, the sensitivity of the sensor 16 along the first sensing direction is higher than the sensitivity of the sensor 16 in a direction perpendicular to the signal neutral surface or plane 52. Therefore, in order to increase the reduction of measurement errors due to unwanted effects like a side load or a parasitic moment acting on the sensor 16, the sensor 16 is aligned with the first sensing direction parallel to the direction of $F_L$ in an expected average position of the load carrier vehicle suspension unit 58; and is aligned with the signal neutral bending surface or plane perpendicular to the direction of $F_R$ in an expected average position of the load carrier vehicle suspension unit 58.

The sensor 16 can have a signal neutral bending surface or plane 52 oriented essentially perpendicularly to the second force direction. The signal neutral bending surface or plane can be essentially aligned with a neutral bending surface or plane of the sensor resulting from an action of a force in the second force direction.

The determination of the first force direction and/or determining the second force direction can comprise determining forces acting on said weight transfer portion, either by measurements or calculations.

In a preferred embodiment, the method further comprises transmitting data representative of the at least one sensor value wirelessly, preferably to a load carrier vehicle hub. It is preferred that at least one of the following steps is performed by the load carrier vehicle hub: determining a mass based on the at least one sensor value; determining a weight of the load of the vehicle; determining a weight of the load carrier vehicle; determining at least one of the n partial torques, and determining a centre of gravity.

When this application refers to a sensor, it is to be understood that the sensor can be a part of a monitoring device, which in turn can transmit data representative of a measured sensor value to a load carrier vehicle hub, and calculations discussed in this application can be carried out by a load carrier vehicle hub. These calculations can contribute to the determination of forces, masses and centres of gravity.

The invention claimed is:

1. A method for monitoring a load carrier vehicle, comprising:
    measuring at least one sensor value indicating a force;
    determining a mass based on the at least one sensor value;
    determining n partial weights based on the at least one sensor value indicating the force, wherein the load carrier vehicle has n weight transfer portions, each partial weight being associated with a respective one of the n weight transfer portions and wherein a weight of the load of the load carrier vehicle is transferred by means of the weight transfer portions to a surface bearing the load carrier vehicle.

2. The method according to claim 1, further comprising:
    determining a weight of the load of the load carrier vehicle based on the n partial weights.

3. The method according to claim 2,
    wherein determining the mass using the at least one sensor value comprises determining the mass based on the sum of the weight of the load of the load carrier vehicle and a weight of the load carrier vehicle;
    wherein determining a weight of the load carrier vehicle is based on parameters of the load carrier vehicle.

4. The method according to claim 1, further comprising:
    determining n partial torques, each resulting from a respective partial weight acting on an associated effective weight transfer position;
    determining a centre of gravity using the n partial torques,
    wherein the centre of gravity is a centre of gravity of the load of the load carrier vehicle or a centre of gravity of the load carrier vehicle including the load of the load carrier vehicle.

5. The method according to claim 1, further comprising:
    determining, with respect to one of the weight transfer portions, a first force direction corresponding to a main weight transfer direction;
    determining, with respect to said weight transfer portion, a second force direction transverse to the first force direction; and
    providing said weight transfer portion with a sensor having a first sensing direction and a second sensing direction and arranging the sensor on the load carrier vehicle with the first sensing direction essentially oriented along the first force direction and with the second sensing direction essentially oriented along the second force direction.

6. The method according to claim 1, further comprising:
    transmitting data representative of the at least one sensor value wirelessly to a load carrier vehicle hub.

7. Monitoring A monitoring device for a load carrier vehicle, comprising:
    at least one sensor device with at least one sensor, wherein the monitoring device is adapted to at least participate in carrying out or adapted to carry out the method according to claim 1.

8. The monitoring device according to claim 7, the sensor further comprising:
    a force sensing plate comprising at least one strain gauge and/or
    a counter acting plate connected to the force sensing plate.

9. The monitoring device according to claim 8,
    wherein the sensor further comprises a direction sensitive strain gauge.

10. The monitoring device according to claim 9,
    wherein the direction sensitive strain gauge comprises a first strain gauge element, and/or the direction sensitive strain gauge comprises a second strain gauge element.

11. The monitoring device according to claim 10,
wherein the first strain gauge element is sensitive to strain in a direction defined by a first line segment, and is oriented along the first line segment; and/or the second strain gauge element is sensitive to strain in a direction defined by a second line segment and is preferably oriented along the second line segment.

12. The monitoring device according to claim 11, comprising:
two direction sensitive strain gauges, each comprising a first strain gauge element, wherein the two direction sensitive strain gauges are provided such that the first strain gauge element of a first one of the two direction sensitive strain gauges is essentially aligned with the first strain gauge element of a second one of the two direction sensitive strain gauges along a strain gauge alignment line.

13. The monitoring device according to claim 9,
wherein at least one of the direction sensitive strain gauges is placed between at least two respective groove sections formed in the force sensing plate.

14. The monitoring device according to claim 7, further comprising:
a wireless communication unit adapted to transmit data representative of a sensor value measured by the sensor.

15. A load carrier vehicle system comprising:
a first load carrier vehicle according to claim 14, and
a second load carrier vehicle,
wherein the first load carrier vehicle can be configured to couple mechanically to the second load carrier vehicle to transmit an acceleration and/or deceleration force between the first load carrier vehicle and the second load carrier vehicle.

16. A load carrier vehicle comprising at least one monitoring device according to claim 7,
wherein the monitoring device comprises a sensor; and
wherein the monitoring device is adapted to transmit data representative of a sensor value measured by the sensor.

17. A load carrier vehicle according to claim 16, the load carrier vehicle further comprising:
a load carrier vehicle chassis;
a load carrier vehicle suspension unit fixed with respect to the load carrier vehicle chassis, the load carrier vehicle suspension unit comprising:
an axle support element mounted movably with respect to the load carrier vehicle chassis, and
a flexible bellow structure with a flexible bellow, wherein the flexible bellow is fillable with a compressible fluid, the flexible bellow structure being mounted between the axle support element and the load carrier vehicle chassis,
wherein the monitoring device is positioned in a force transmission path between one end of the flexible bellow and the load carrier vehicle chassis or the load carrier vehicle suspension unit.

18. A load carrier vehicle according to claim 17, wherein the load carrier vehicle is adapted to be coupled with a further load carrier vehicle, the load carrier vehicle further comprising:
a load carrier vehicle support element adapted to transfer at least a part of a weight of the load carrier vehicle to a surface bearing the load carrier vehicle, wherein a contact portion of the load carrier vehicle support element is adapted to be lifted form the surface bearing the load carrier vehicle; and
a monitoring device, preferably according to any one of the claims 7 to 14, associated with the load carrier vehicle support element and adapted to measure weight transferred through the load carrier vehicle support element.

19. A load carrier vehicle according to claim 18,
wherein the monitoring device is adapted to transmit data representative of the sensor value measured by the sensor wirelessly.

20. A load carrier vehicle system according to claim 15, further comprising:
an actuator adapted to act between the first and the second load carrier vehicle to transfer weight from one of the first and second load carrier vehicle to the other one of the first and second load carrier vehicle through the actuator in a first state of the actuator, and
adapted not to transfer weight from one of the first and second load carrier vehicle to the other one of the first and second load carrier vehicle through the actuator in a second state of the actuator,
wherein the weight transferred through the actuator is measured by a monitoring device according to any one of the claims 7 to 14.

21. A swap body for a commercial vehicle having at least one non-rotatable support device having at least one support element extending vertically in a support position, wherein each support element has a standing surface, wherein each support element is associated with a monitoring device according to claim 7.

* * * * *